United States Patent
Zhao et al.

(10) Patent No.: US 12,328,709 B2
(45) Date of Patent: Jun. 10, 2025

(54) SIDELINK DATA TRANSMISSION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 564 days.

(21) Appl. No.: 17/557,430

(22) Filed: Dec. 21, 2021

(65) Prior Publication Data

US 2022/0116916 A1    Apr. 14, 2022

Related U.S. Application Data

(63) Continuation of application No. PCT/CN2019/120399, filed on Nov. 22, 2019.

(30) Foreign Application Priority Data

Jul. 12, 2019  (WO) ............... PCT/CN2019/095684

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01);
(Continued)

(58) Field of Classification Search
CPC ..... H04W 72/02; H04W 72/20; H04W 72/23; H04W 72/0446; H04W 72/0453; H04W 72/1263
See application file for complete search history.

(56) References Cited

U.S. PATENT DOCUMENTS

| | | | | |
|---|---|---|---|---|
| 2021/0345378 A1 | 11/2021 | Lu et al. | | |
| 2022/0116950 A1* | 4/2022 | Zhao | ............. | H04L 5/0094 |
| 2022/0321306 A1* | 10/2022 | Wang | ............. | H04L 1/1864 |

FOREIGN PATENT DOCUMENTS

| | | |
|---|---|---|
| CN | 105451211 A | 3/2016 |
| CN | 107079437 A | 8/2017 |

(Continued)

OTHER PUBLICATIONS

Second Office Action issued in corresponding Japanese application No. 2021-578175, mailed Dec. 22, 2023.
(Continued)

*Primary Examiner* — Peter Chen
*Assistant Examiner* — Jia Hao Deng
(74) *Attorney, Agent, or Firm* — BAYES PLLC

(57) ABSTRACT

Embodiments of the present application relate to a method, terminal device, and network device for transmitting sidelink data. The method includes: receiving, by a first terminal device, sidelink transmission resource indication information and first uplink transmission resource indication information configured by a network device, where the sidelink transmission resource indication information is used for indicating a sidelink transmission resource, and the first uplink transmission resource indication information is used for indicating a first uplink transmission resource; transmitting, by the first terminal device, sidelink data to at least one second terminal device on the sidelink transmission resource; transmitting, by the first terminal device, the first feedback information to the network device, where the first
(Continued)

feedback information is used for indicating whether the sidelink data has been received correctly.

16 Claims, 6 Drawing Sheets

(51) Int. Cl.
| | | |
|---|---|---|
| H04W 72/0453 | (2023.01) | |
| H04W 72/1263 | (2023.01) | |
| H04W 72/20 | (2023.01) | |
| H04W 72/23 | (2023.01) | |

(52) U.S. Cl.
CPC ....... *H04W 72/1263* (2013.01); *H04W 72/20* (2023.01); *H04W 72/23* (2023.01)

(56) References Cited

FOREIGN PATENT DOCUMENTS

| | | | |
|---|---|---|---|
| CN | 107371182 A | 11/2017 | |
| CN | 109217989 A | 1/2019 | |
| CN | 109565853 A | 4/2019 | |
| WO | WO-2009051402 A2 * | 4/2009 | ........... H04L 5/0094 |
| WO | 2018030775 A1 | 2/2018 | |
| WO | 2018145296 A1 | 8/2018 | |
| WO | WO-2018185638 A1 * | 10/2018 | ............... H04L 1/08 |
| WO | WO-2018203669 A1 * | 11/2018 | ........... H04B 7/0632 |
| WO | 2018232321 A2 | 12/2018 | |
| WO | 2019019184 A1 | 1/2019 | |
| WO | 2019027304 A1 | 2/2019 | |

OTHER PUBLICATIONS

Second Office Action issued in corresponding Canadian application No. 3,145,332, mailed Jan. 3, 2024.
First Office Action issued in corresponding Canadian application No. 3,145,332, mailed Mar. 10, 2023.
First Office Action issued in corresponding European application No. 19937910.8, mailed Mar. 29, 2023.
First Office Action issued in corresponding Chinese application No. 202111462956.X, mailed Apr. 19, 2023.
First Office Action issued in corresponding Japanese application No. 2021-578175, mailed Jul. 18, 2023.
Second Office Action issued in corresponding Chinese application No. 202111462956.X, mailed Jul. 26, 2023.
Second Office Action issued in corresponding European application No. 19937910.8, mailed Sep. 21, 2023.
3GPP TSG RAN WG1 Meeting #96bis Xi'an, China, Apr. 8-12, 2019; R1-1903944 Source: Huawei, HiSilicon; Title: Sidelink physical layer procedures for NR V2X.
3GPP TSG RAN WG1 Meeting #96bis Xi'an, China, Apr. 8-12, 2019; R1-1905356 Source: CATT; Title: Discussion on physical layer procedures for sidelink in NR V2X.
3GPP TSG-RAN WG1 Meeting #97 Reno, USA, May 13-17, 2019; R1-1907947 Source: Ericsson; Title: Feature lead summary #5 on Resource allocation for NR sidelink Mode 1.
International Search Report issued in corresponding International Application No. PCT/CN2019/120399, mailed Mar. 24, 2020, 48 pages.
Written Opinion of the International Searching Authority issued in corresponding International Application No. PCT/CN2019/120399, mailed Mar. 24, 2020, 9 pages.
International Search Report issued in corresponding International Application No. PCT/CN2019/095684, mailed Apr. 16, 2020, 2020, 45 pages.

Written Opinion of the International Searching Authority issued in corresponding International Application No. PCT/CN2019/095684, mailed Apr. 16, 2020, 2020, 9 pages.
"Discussion on sidelink resource allocation mode 1", Agenda Item: 7.2.4.2.1, Source: Huawei, HiSilicon, 3GPP TSG RAN WG1 Meeting #97, R1-1906010, Reno, USA, May 13, 17, 2019, 9 pages.
"On Mode 1 resource allocation in NR V2X", Agenda Item: 7.2.4.2.1, Source: CATT, 3GPP TSG RAN WG1 Meeting #97, R1-1906315, Reno, USA, May 13-17, 2019, 4 pages.
"Mode 1 resource allocation for NR SL", Agenda Item: 7.2.4.2.1, Source: Oppo, 3GPP TSG RAN WG1 #97, R1-1906473, Reno, USA, May 13-17, 2019, 7 pages.
"Design aspects for NR V2X sidelink communication in resource allocation Mode-1", Agenda item: 7.2.4.2.1, Source: Intel Corporation, 3GPP TSG RAN WG1 Meeting #97, R1-1906795, Reno, USA, May 13-17, 2019, 9 pages.
"On Resource Allocation for NR V2X Mode 1", Agenda item: 7.2.4.2.1, Source: Samsung, 3GPP TSG RAN WG1 #97, R1-1906935, Reno, USA, May 13-17, 2019, 8 pages.
"Discussion on resource allocation for NR sidelink Mode 1", Agenda item: 7.2.4. 2.1, Source : LG Electronics, 3GPP TSG RAN WG1 #97 Meeting, R1-1907013, Reno, May 13-17, 2019, 5 pages.
"Uu based sidelink resource allocation", Agenda Item: 7.2.4.2.1, Source: Ericsson, 3GPP TSG RAN WG1 Meeting #97, R1-1907135, Reno, US , May 13, 17, 2019, 8 pages.
"Mode 1 Resource allocation for NR-V2X", Agenda item: 7.2.4.2.1, Source: Qualcomm Incorporated, 3GPP TSG RAN WG1 Meeting #97, R1-1907270, Reno, USA, May 13-17, 2019, 3 pages.
Extended European Search Report issued in corresponding European application No. 19937910.8, mailed Jun. 27, 2022.
First Office Action issued in corresponding Indian application No. 202117060728, mailed Jun. 24, 2022.
Lenovo et al., "SL HARQ operation", R2-1904159, 3GPP TSG RAN WG2 Meeting #105bis Xi'an, China, Apr. 8-12, 2019.
Ericsson, "Mode-1 Implications for Supporting SL HARQ feedbacks", TDoc R2-1901651, 3GPP TSG-RAN WG2 #105 Athens, Greece, Feb. 25-Mar. 1, 2019.
Ericsson, "On the Support of HARQ feedbacks Over Sidelink", TDoc R2-1907351, 3GPP TSG-RAN WG2 #106 Reno, USA, May 13-May 17, 2019.
OPPO, "Discussion of Uu-based sidelink resource allocation and configuration", R1-1900303, 3GPP TSG RAN WG1 Ad-Hoc Meeting 1901 Taipei, Jan. 21-25, 2019.
CATT, "HARQ Procedure for Mode 1", R2-1816897, 3GPP TSG-RAN WG2 Meeting #104 Spokane, USA, Nov. 12-16, 2018.
Notice of Allowance issued in corresponding European application No. 19937910.8, mailed Apr. 10, 2024.
Hearing Notice issued in corresponding Indian application No. 202117060728, mailed May 9, 2024.
Notice of Allowance issued in corresponding Japanese application No. 2021-578175, mailed Jun. 25, 2024.
Extended European search report issued in corresponding European application No. 24187832.1, mailed Aug. 29, 2024.
Request for the Submission of an Opinion issued in corresponding Korean Application No. 10-2021-7043191, mailed on Feb. 20, 2025, 15 pages.
"Discussion on NR sidelink mode 1 resource allocation", Agenda Item: 7.2.4.2.1, Source: Spreadtrum Communications, 3GPP TSG RAN WG1 #97, R1-1906363, Reno, USA, May 13-17, 2019, 8 pages.
"Discussion on physical layer procedure", Agenda Item: 7.2.4.1.2, Source: MediaTek Inc., 3GPP TSG RAN WG1 #96, R1-1901810, Athens, Greece, Feb. 25-Mar. 1, 2019, 9 pages.

* cited by examiner

SIDELINK DATA TRANSMISSION METHOD, TERMINAL DEVICE AND NETWORK DEVICE

CROSS-REFERENCE TO RELATED APPLICATION

This application is a continuation of International Application No. PCT/CN2019/120399, filed on Nov. 22, 2019, and claims priority to International Patent Application No. PCT/CN2019/095684 filed with China's State Intellectual Property Office on Jul. 12, 2019, titled "Sidelink Data Transmission Method, Terminal Device And Network Device", which is incorporated herein by reference in its entirety.

TECHNICAL FIELD

The present disclosure relates to the field of communications, and in particular to a sidelink data transmission method, a terminal device and a network device.

BACKGROUND

In New Radio (NR)-Vehicle to Everything (V2X), the network can allocate configured grant transmission resources of the sidelink to a transmitting terminal. The transmitting terminal may transmit sidelink data to a receiving terminal on the configured grant transmission resources, and the receiving terminal feeds back an acknowledgement (ACK) or negative acknowledgement (NACK) to the transmitting terminal according to a detection result.

SUMMARY

Embodiments of the present application provide a method for transmitting sidelink data, a terminal device, and a network device.

In a first aspect, a method for transmitting sidelink data is provided. The method includes: receiving, by a first terminal device, sidelink transmission resource indication information and first uplink transmission resource indication information configured by a network device, where the sidelink transmission resource indication information is used for indicating a sidelink transmission resource, and the first uplink transmission resource indication Information is used for indicating a first uplink transmission resource; transmitting, by the first terminal device, sidelink data to at least one second terminal device on the sidelink transmission resource; transmitting, by the first terminal device, the first feedback information to the network device on the first uplink transmission resource, where the first feedback information is used for indicating whether the sidelink data has been received correctly.

In a second aspect, a terminal device is provided. The terminal device includes a processor and a memory. The memory is configured to store a computer program, and the processor is configured to call and run the computer program stored in the memory to execute operations of: receiving sidelink transmission resource indication information and first uplink transmission resource indication information configured by a network device, where the sidelink transmission resource indication information is used for indicating a sidelink transmission resource, and the first uplink transmission resource indication information is used for indicating a first uplink transmission resource; transmitting sidelink data to at least one second terminal device on the sidelink transmission resource; and transmitting first feedback information to the network device on the first uplink transmission resource, where the first feedback information is used for indicating whether the sidelink data has been received correctly.

In a third aspect, a network device is provided. Specifically, the network device includes a processor and a memory, the memory is configured to store a computer program, and the processor is configured to call and run the computer program stored in the memory to execute operations of: transmitting sidelink transmission resource indication information and first uplink transmission resource indication information to a terminal device, where the sidelink transmission resource indication information is used for indicating a sidelink transmission resource that is used for transmitting sidelink data to at least one second terminal device from a first terminal device, and the first uplink transmission resource indication information is used for indicating a first uplink transmission resource; and receiving, on the first uplink transmission resource, first feedback information transmitted from the first terminal device, where the first feedback information is used for indicating whether the sidelink data has been received correctly.

DETAILED DESCRIPTION

The technical solutions of the embodiments of the present application will be described below with reference to the accompanying drawings in the embodiments of the present application. Apparently, only a part of the embodiments, not all the embodiments of the present application, are described. All other embodiments obtained, based on the embodiments described in the present application, by those skilled in the art without paying creative efforts shall fall within the protection scope of the present application.

The technical solutions of the embodiments of the present disclosure can be applied to various communication systems, such as a global system for mobile communications (GSM), a code division multiple access (CDMA) system, and a wideband code division multiple access (WCDMA) system, a general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) communication system or 5G system, etc.

Figure 1:
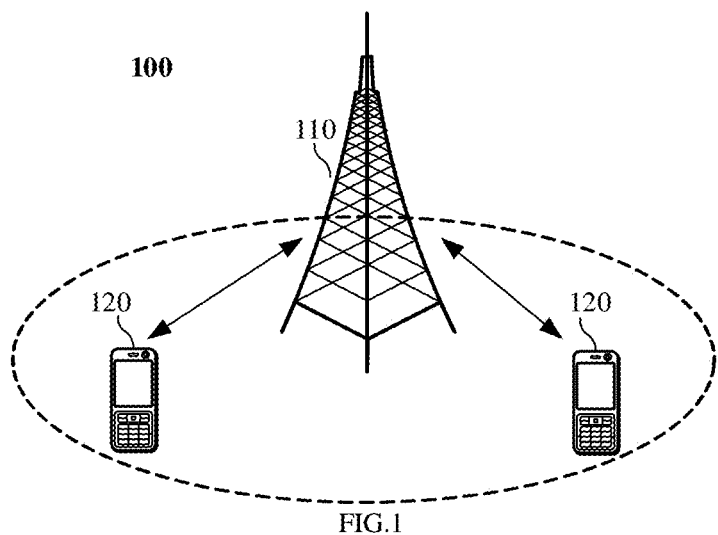
FIG. 1 is a schematic diagram illustrating a communication system architecture provided by embodiments of the present application.

For example, a communication system 100 to which embodiments of the present application are applied is shown in FIG. 1. The communication system can include a network device 110 communicating with a terminal device 120 (or referred as a communication terminal, terminal). The network device 110 can provide communication coverage over a specific geographic area, and can communicate with terminal devices located in the coverage area. Optionally, the network device 110 may be a base transceiver station (BTS) in a GSM system or a CDMA system, or a Node B (NB) in a WCDMA system, or an evolutional Node B (eNB or eNode B) in an LTE system, or a radio controller in a cloud radio access network (CRAN). Optionally, the network device may be a mobile switching center, a relay station, an access point, a vehicle-mounted device, a wearable device, a hub, a switch, a network bridge, a router, a network side device in the 5G network, or a network device in the future evolution of the public land mobile network (PLMN), etc.

The communication system 100 further includes at least one terminal device 120 located in the coverage area of the network device 110. The "terminal device" as used herein are connected via connections that include, but are not limited to, a connection via a wired line, such as a connection via Public Switched Telephone Networks (PSTN), a Digital Subscriber Line (DSL), a digital cable and a direct cable; and/or another data connection/network; and/or via a wireless interface, such as cellular network, Wireless Local Area Network (WLAN), digital television network such as DVB-H network, satellite network and an AM-FM broadcast transmitter; and/or a device of another terminal configured to receive/send communication signals; and/or an Internet of things (IOT) device. A terminal device configured to communicate via a wireless interface can be referred as "a wireless communication terminal", "a wireless terminal" or "a mobile terminal". Examples of mobile terminals include, but are not limited to, satellite or cellular phones; Personal Communications System (PCS) terminals integrated with capabilities of cellular radio phones, data processing, fax, and data communication; a PDA that can include radio phones, pagers, Internet/intranet accessing, Web browser, memo pad, calendar, and/or Global Positioning System (GPS) receiver; and conventional laptop and/or palmtop receivers or other electronic device including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user devices. The access terminal may be a cellular phone, a cordless phone, a Session Initiation Protocol (SIP) phone, a wireless local loop (WLL) station, a personal digital assistant (PDA), computing devices, handheld devices having wireless communication functions, or other processing devices connected to wireless modems, vehicle-mounted devices, wearable devices, terminal devices in 5G networks, or terminal devices in the future evolution of PLMN, etc.

Optionally, a Device to Device (D2D) communication may be performed between the terminal devices 120.

Optionally, the 5G system or 5G network may also be referred to as a New Radio (NR) system or NR network.

FIG. 1 exemplarily illustrates one network device and two terminal devices. Optionally, the communication system 100 may include multiple network devices, and the number of terminal devices within the coverage of each network device is not limited to be two, which is not limited in the embodiments of the present application.

Optionally, the communication system 100 may further include other network entities such as a network controller and a mobility management entity, which is not limited in the embodiment of the present disclosure.

It should be understood that a device having communication functions in the network/system in the embodiments of the present disclosure may be referred to as a communication device. Taking the communication system 100 shown in FIG. 1 as an example, the communication device may include the network device 110 and the terminal device 120 having communication functions, and the network device 110 and the terminal device 120 may be specific devices described above, which will not be repeated here. The communication device may also include other devices in the communication system 100, such as the network controller, the mobile management entity and other network entities, which are not limited in the embodiments of the present disclosure.

It should be understood that the terms "system" and "network" herein are generally interchangeable herein. The term "and/or" herein is only used to describe an association relationship between associated objects, which represents that there may be three kinds of relationships. For example, A and/or B may represent three situations: A exists alone, A and B exist at the same time, and B exists alone. In addition, the character "/" herein generally represents an "or" relationship between pre and post associated objects.

Device-to-device communication is a sidelink (SL) transmission technology based on device to device (D2D). The internet of vehicles (IOV) system adopts terminal-to-terminal direct communication, which is different from the way in which communication data is received or transmitted through a base station in a traditional cellular system. Therefore, the IOV system has higher spectrum efficiency and lower transmission delay. Two transmission modes are defined in the 3rd Generation Partnership Project (3rd Generation Partnership Project, 3GPP): Mode A and Mode B.

Figure 2:
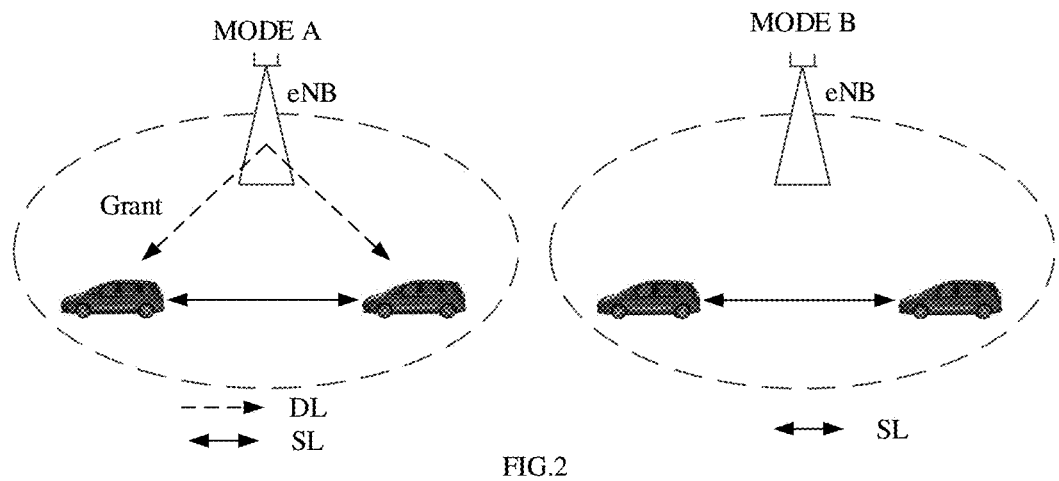
FIG. 2 is a schematic diagram illustrating two transmission modes in the Internet of Vehicles provided by embodiments of the present application.

FIG. 2 is a schematic diagram illustrating two transmission modes. As shown in FIG. 2, in mode A, transmission resources for terminal devices are allocated by a base station via a down link (DL), and the terminal devices transmit data on the sidelink according to the resources allocated by the base station. The base station can allocate resources used for a single transmission to the terminal device, and can also allocate semi-persistent static transmission resources to the terminal device.

As shown in FIG. 2, in mode B, a vehicle user equipment selects a resource in a resource pool to perform sidelink data transmission.

In NR-V2X, automatic driving should be supported. To this end, higher requirements on data interaction between vehicles, such as higher throughput, lower delay, higher reliability, larger coverage, more flexible resource allocation and the like, are needed.

In the NR-V2X system, multiple transmission modes, i.e., mode 1 and mode 2, are introduced. In mode 1, the network allocates transmission resources for the terminal (corresponding to the above mode A), and in mode 2, the terminal selects transmission resources (that is, corresponding to the above Mode B).

Figure 3:
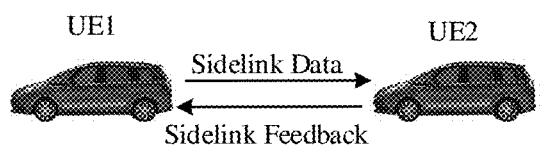
FIG. 3 is a schematic diagram illustrating data transmission between any two vehicles provided by embodiments of the present application.

In NR-V2X, in order to improve transmission reliability, a feedback channel is introduced on the side link. Specifically, FIG. 3 is a schematic diagram illustrating data transmission between any two vehicles. As shown in FIG. 3, vehicle UE1 and vehicle UE2 form a unicast link. UE1 transmits sidelink data to UE2, and UE2 transmits sidelink feedback information to UE1 according to the detection result of the received sidelink data. The feedback information can be used to indicate whether the sidelink data has been correctly received by UE2. For example, the feedback information may be Hybrid Automatic Repeat reQuest (HARQ) ACK or NACK. In response to receiving UE2's feedback information, UE1 decides whether to perform a data retransmission to UE2.

In 3GPP Rel-15, in order to reduce the transmission delay of uplink data, Configured Grant transmission (or called as grant-free transmission) method is introduced. Configured grant transmission mainly includes two configured grant methods, i.e., type-1 configured grant and type-2 configured grant.

In type-1 configured grant method, the network configures transmission resources for the terminal through radio resource control (Radio Resource Control, RRC) signaling. The RRC signaling configuration may include: time domain resources, frequency domain resources, and demodulation reference signals (DMRS), power control, modulation and coding scheme (MCS), waveform, redundancy version (RV), number of repetitions, frequency hopping, the number of HARQ processes, etc., including all transmissions resources and transmission parameters. Once the UE receives the high-level parameters, it can immediately use the configured transmission parameters to perform physical uplink shared channel (PUSCH) transmission on the configured time-frequency resources.

In type-2 configured grant method, resource configuration is achieved through two steps. First, the high-level parameters (for example, ConfiguredGrantConfig) are used to configure transmission resources and transmission parameters including the period of time-frequency resources, open-loop power control, waveform, redundancy version, number of retransmissions, frequency hopping, the number of HARQ processes. Next, the downlink control information (DCI) is used to activate PUSCH transmission of type-2 configured grant, and configure other transmission resources and transmission parameters including the time domain resources, frequency domain resources, DMRS, MCS and the like at the same time. Upon receiving the high-level parameter ConfiguredGrantConfig, the UE cannot immediately use the resources and parameters configured by the high-level parameter to perform PUSCH transmission. On the contrary, PUSCH transmission can be performed until the corresponding DCI is received to activate and configure other resources and transmission parameters. In addition, the network can deactivate the configured transmission through DCI. After the terminal receives the DCI for deactivating, the transmission resource can no longer be used for transmission.

If a configured grant transmission resource is allocated to the terminal by the network, when transmitting uplink data, the terminal can directly use such transmission resource for transmission without transmitting a scheduling request (SR) or buffer status report (BSR) to the network to request transmission resources, thereby reducing delay.

In NR-V2X, the network can allocate configured grant transmission resources of the sidelink to a transmitting terminal. The transmitting terminal may transmit sidelink data to a receiving terminal on the configured grant transmission resources, and the receiving terminal feeds back ACK or NACK to the transmitting terminal according to a detection result. If the NACK is received by the transmitting terminal, then the sidelink data needs to be retransmitted. However, in this case, how to retransmit the data by the transmitting terminal has not been solved yet. For example, whether the transmitting terminal will notify the network of the NACK to request retransmission resources or whether the transmitting terminal will autonomously perform data retransmission. If the transmitting terminal notifies the network of the NACK, how to obtain the transmission resource for transmitting the NACK to the network.

In view of this, embodiments of the present application propose a method for transmitting sidelink data, which can be used to solve the above-mentioned problem.

Figure 4:
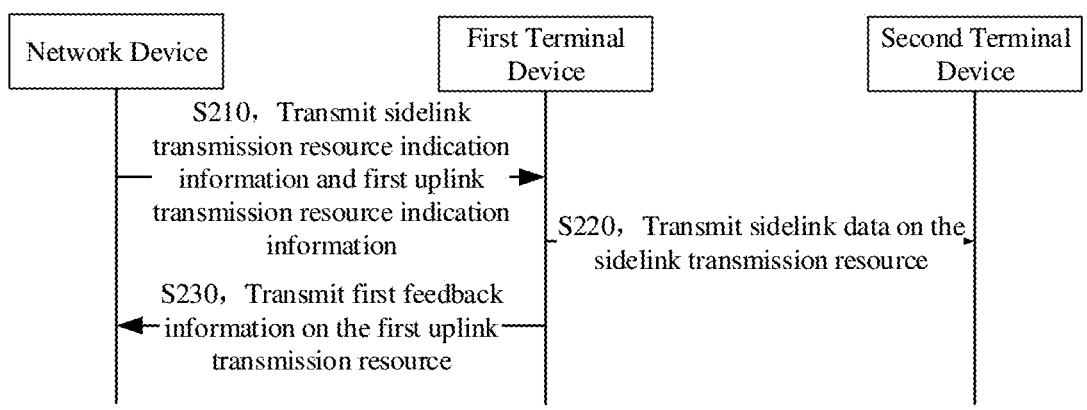
FIG. 4 is a schematic diagram illustrating a method for transmitting sidelink data provided by embodiments of the present application.

FIG. 4 is a schematic flowchart illustrating a method 200 for transmitting sidelink data according to embodiments of the application. As shown in FIG. 4, the method 200 may include steps described below. In S210, sidelink transmission resource indication information and first uplink transmission resource indication information are transmitted, that is, the first terminal device receives the sidelink transmission resource indication information and the first uplink transmission resource indication information configured by the network device. The sidelink transmission resource indication information is used to indicate the sidelink transmission resource, and the first uplink transmission resource indication information is used to indicate the first uplink transmission resource.

It should be understood that the network device in the method 200 may be any network device, for example, the network device shown in FIG. 1, and the first terminal device in the method 200 may be any terminal device, for example, the terminal device shown in FIG. The first terminal device is a transmitting end in the sidelink data transmission process. In order to facilitate distinguishing the terminal devices, as shown in FIG. 2, the second terminal device is a receiving end in the sidelink data transmission process. Among them, considering that there may be one or more terminal devices at the receiving end of sidelink data, for example, during unicast transmission, a terminal device at the transmitting end corresponds to one terminal device at the receiving end; while during multicast transmission, a terminal device at the transmitting end may correspond to multiple terminal devices at the receiving end. Therefore, the second terminal device may refer to any terminal device at the receiving end, or the second terminal device may also refer to multiple terminal devices at the receiving end, which is not limited in the embodiments of the application.

In embodiments of the present application, the network device transmits the sidelink transmission resource indication information to the first terminal device, so as to indicate the sidelink transmission resource. The sidelink transmission resource can be used for data transmission between the first terminal device and the second terminal device, for example, can be used to transmit at least one of a sidelink data channel, a sidelink control channel, and a sidelink feedback channel. Specifically, the sidelink transmission resources can be configured in a dynamic configuration mode, or can also be configured in a semi-static mode.

For example, the first terminal device receives the sidelink transmission resource indication information configured by the network device in the following way: the first terminal device receives configured grant information transmitted from the network device, and the configured grant information includes the sidelink transmission resource indication information.

Specifically, the sidelink transmission resource is configured by the configured grant information, and is the sidelink configured grant transmission resource. According to the configured grant method, the sidelink configured grant transmission resource can be the type-1 or type-2 configured grant transmission resources. Type-1 configured grant is configured through RRC signaling, and RRC signaling includes configured grant transmission resources and transmission parameters.

Type-2 configured grant is configured first through RRC signaling, and the RRC signaling can configure part of configured grant transmission parameters, and is activated or deactivated through DCI signaling. The DCI signaling may further include configured grant transmission resources and part of transmission parameters.

It should be understood that no matter which resource allocation method is adopted, the sidelink transmission resource indication information transmitting from the network device in the embodiments of the present application may include at least one of the following information: parameter information about the sidelink data channel, and parameter information about the sidelink control channel, parameter information about the sidelink feedback channel, and second uplink transmission resource indication information. Each type of such parameters is described below in detail.

The parameter information about the sidelink data channel (for example, physical sidelink shared channel (PSSCH)) may include at least one of the following information: time domain resource parameters of the sidelink data channel, and frequency domain resource parameters of the sidelink data channel, DMRS, transmission mode, number of transmission layers, MCS, maximum transmission times, redundancy version information, number of HARQ processes, power control information, size of sidelink data, identification information of a terminal device that receives the sidelink data, priority information, time delay information, code block group (CBG) feedback indication, whether the sidelink data channel includes channel state information (CSI)-reference signal (RS), the time domain resource parameter of the CSI-RS, the frequency domain resource parameter of the CSI-RS, and CSI feedback indication information.

In particular, the time domain resource parameters of the sidelink data channel may include at least one of the following parameters: period information of the sidelink data channel, slot information (such as slot index, or offset relative to the system frame number (SFN) #0), information of time domain symbol occupied in each slot.

The frequency domain resource parameters of the sidelink data channel may include at least one of the following parameters: a starting frequency domain position of the sidelink data channel, size of frequency domain occupied by the sidelink data channel, and size of the minimum frequency domain unit occupied by the sidelink data channel, for example, taking the subband as the minimum frequency domain unit, and each subband includes 4, 8, and 10 physical resource blocks (PRB).

The DMRS of the sidelink data channel may include at least one of the following information: DMRS's pattern, scrambling ID information of the DMRS sequence, the number of time domain symbols occupied by the DMRS, and positions of the time domain symbols occupied by the DMRS. If the DMRS of the sidelink data channel supports at least one pattern in the time domain, a certain DMRS pattern may be specified in the sidelink transmission resource indication information or configured grant information.

The transmission mode of the sidelink data channel may include at least one of the following: single-port transmission, space frequency block code (SFBC), cyclic delay diversity (Cyclic Delay Diversity, CDD), Pre-coder cycling. If the sidelink supports at least one transmission mode, the network device may specify a certain transmission mode in the sidelink transmission resource indication information or configured grant information.

The sidelink data channel can include one transmission layer or two transmission layers, or other multiple transmission layers.

The MCS may include MCS levels used by the sidelink data.

The maximum transmission number (also can be referred to as the number of repetitions) can be used to indicate the maximum transmission number of each sidelink data packet (that is, one transmission block, TB), for example, it can include the first transmission and retransmission.

The redundancy version (RV) information may include the redundancy version information corresponding to each transmission if the sidelink data channel is transmitted multiple times. For example, the order of the redundancy version is [0 2 3 1], corresponding to four transmissions (the first transmission and 3 retransmissions) respectively. If the number of data transmissions is greater than 4, the above redundancy version is reused.

The number of HARQ processes may refer to the number of HARQ processes supported by the sidelink data channel.

The power control information can indicate that the sidelink data channel performs power control based on path loss of the downlink or path loss of the sidelink. Optionally, the power control information can also indicate a power deviation between the sidelink control channel and the sidelink data channel, power spectral density deviation and other information.

The size of the sidelink data may be the size of the transmission block of the sidelink data.

The identification information of the terminal device that receives the sidelink data is the destination identification information, which refers to the destination identification of the sidelink data. The identification information may be, for example, the identification information of the second terminal device served as the receiving end, group identification information, or an index of a destination of the V2X communication.

As for the priority information, only sidelink data or services corresponding to the priority can be transmitted on the sidelink transmission resources indicated by the sidelink transmission resource indication information, or the sidelink data or services whose priority is higher than or equal to the priority information may be transmitted on the sidelink transmission resource indicated by the sidelink transmission resource indication information. For example, it is assumed that the priority is Prose Per Packet Priority (PPPP) with a value range [0,7]. The lower the value of PPPP, the higher the priority level. Taking the situation where the network device transmits the configured grant to the terminal device as an example, if the priority information configured by the network device is 3, it means that only the sidelink data with the priority PPPP of 3 can be transmitted on the configured grant resource, or sidelink data has a higher priority, that is, priority PPPP of 0, 1, 2, 3, can be transmitted on the configured grant resource.

As for delay information, only the sidelink data or services corresponding to the delay information can be transmitted on the sidelink transmission resources configured by the network device, or the sidelink data or services with a delay requirement higher than or equal to the delay information can be transmitted on the sidelink transmission resource. For example, taking the situation where the network device transmits the configured grant to the terminal device as an example, if the delay information of the configured grant transmitted from the network device is 10 ms, it means that only sidelink services with a delay requirement of 10 ms, or sidelink services with a higher delay requirement (such as 3 ms, 5 ms) can be transmitted on the configured grant resource.

The CBG feedback indication information is used to determine whether the sidelink data supports CBG-based feedback. For example, if the indication information is 1, it means that CBG-based feedback is supported, that is, the second terminal device as the receiving end of sidelink data needs to feed back HARQ ACK or NACK for each CBG; if the indication information is 0, it means that CBG-based feedback is not supported, that is, the second terminal device feeds back HARQ ACK or NACK for the entire transmission block (TB).

The CSI-RS information may include at least one of the following: whether the sidelink data channel includes CSI-RS, time domain resources of the CSI-RS, and frequency domain resources of the CSI-RS. For example, the CSI-RS may be included in the sidelink data channel, and is used by the second terminal device served as the receiving end to perform channel measurement. Therefore, indication information for indicating whether the sidelink data includes the CSI-RS signal may be carried in the sidelink transmission resource indication information transmitted from the network. As another example, the sidelink transmission resource indication information may further include information indicating the time domain symbols occupied by the CSI-RS. As another example, the frequency domain resource information of the CSI-RS may include the frequency domain offset information and/or the frequency domain resource size of the CSI-RS. For example, if the CSI-RS adopts comb transmission, that is, every m sub-carriers includes one sub-carrier for transmitting CSI-RS, the frequency domain offset information is used to indicate the offset of the first subcarrier used to transmit CSI-RS relative to subcarrier 0 in a resource block (RB). In addition, the frequency domain resource information may include the parameter m.

The CSI feedback indication information can be used to indicate whether the second terminal device served as the receiving end needs to feed back channel state information, such as channel quality indicator (CQI), rank indicator (RI), sidelink reference signal received power (S-RSRP) etc.

The parameter information about the sidelink control channel (for example, the physical sidelink control channel (PSCCH)) may include at least one of the following information: time domain resource parameters of the sidelink control channel, frequency domain resource parameters of the sidelink control channel.

In particular, the time domain resources of the sidelink control channel may include at least one of the following information: the period of the sidelink control channel, the starting position of the time domain symbols of the sidelink control channel in each slot, and the number of time domain symbols occupied by the sidelink control channel.

The frequency domain resources of the sidelink control channel may include at least one of the following information: the frequency domain starting position of the sidelink control channel, the size of the frequency domain resources occupied by each sidelink control channel, and the minimum frequency domain resource granularity of the sidelink control channel, for example, the minimum frequency domain resource granularity is sub-bands, and each sub-band includes 4, 8, 10 PRBs.

The parameter information about the sidelink feedback channel (for example, the physical sidelink feedback channel (PSFCH)) may include at least one of the following information: a time offset of the sidelink feedback channel relative to the sidelink data channel or the sidelink control channel; slot parameters of the sidelink feedback channel; frequency domain resource parameters of the sidelink feedback channel; information on whether the sidelink feedback is enabled, the feedback mode of the sidelink feedback channel, the format of the sidelink feedback channel. The sidelink feedback channel can be used for the second terminal device to feed back the receiving situation of the sidelink data to the first terminal device.

Figure 5:
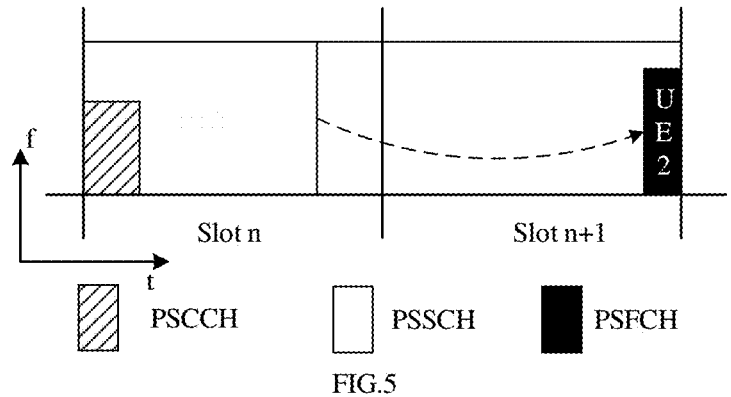
FIG. 5 is a schematic diagram illustrating slots that are occupied by sidelink data and feedback information provided by embodiments of the present application.
Figure 6:
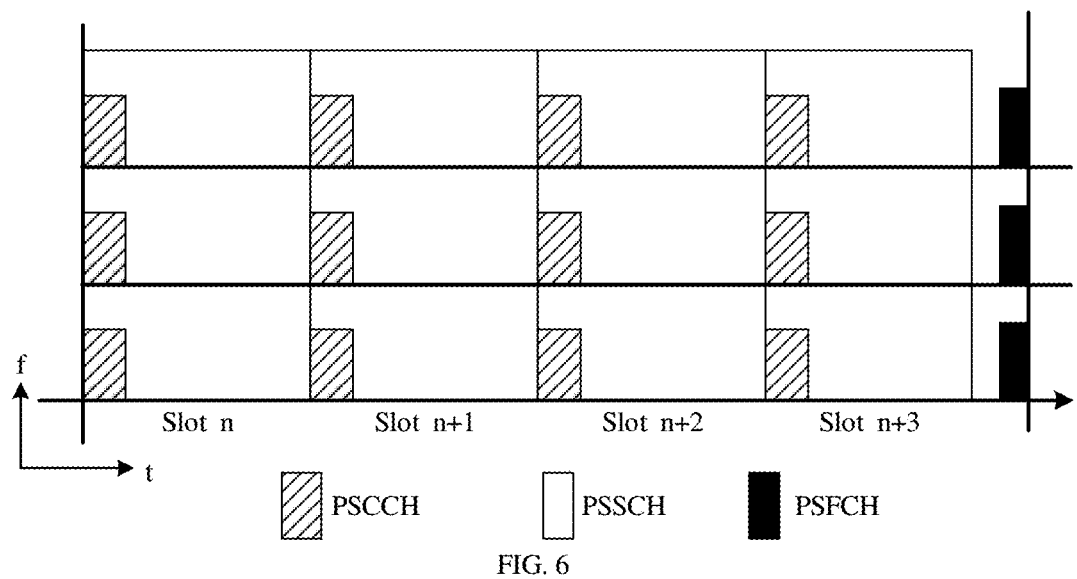
FIG. 6 is another schematic diagram illustrating slots that are occupied by sidelink data and feedback information provided by embodiments of the present application.

In particular, the slot parameter of the sidelink feedback channel may include slot position of the sidelink feedback channel. For example, the slot parameter of the sidelink feedback channel may include time offset of the sidelink feedback channel relative to the sidelink data channel (e.g., PSSCH) or the sidelink control channel (e.g., PSCCH). For example, the network device can configure the time offset between the sidelink feedback channel and its corresponding sidelink data channel for the first terminal device and the second terminal device. For example, as shown in FIG. 5, assuming that the offset K=1, it means that if the first terminal device transmits the sidelink data on slot n, then the second terminal device transmits the feedback information for the sidelink data on slot n+1. As another example, if one slot among every k slots includes a transmission resource that can be used to transmit the feedback channel, the network device can configure the parameter k as the slot offset parameter. For example, as shown in FIG. 6, the slot offset parameter k=4.

The frequency domain resource parameter of the sidelink feedback channel may include the frequency domain starting position and/or the size (or length) of the frequency domain resource of the sidelink feedback channel, configured for the first terminal device and the second terminal device by the network device. Optionally, the frequency domain starting position of the sidelink feedback channel and the frequency domain starting position of the PSCCH or PSSCH may be the same or different. Optionally, the frequency domain length of the sidelink feedback channel may be pre-configured or configured by the network device.

Figure 7:
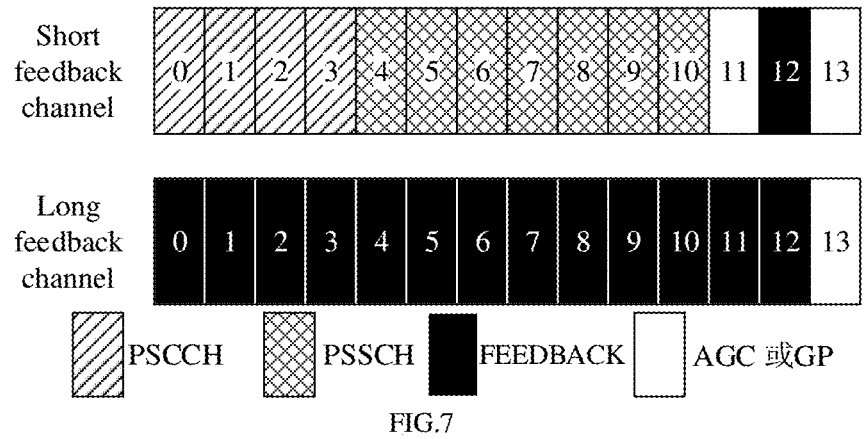
FIG. 7 is a schematic diagram illustrating a feedback channel in different formats provided by embodiments of the present application.

The sidelink feedback channel can include one or more types of formats. For example, in NR-V2X, two types of sidelink feedback channels are mainly discussed, i.e., short feedback channel and long feedback channel. In this case, the network device can specify the format of the feedback channel as the short feedback channel or the long feedback channel. The short feedback channel usually only occupies a few time domain symbols. For example, as shown in FIG. 7, the short feedback channel can only occupy 1 or 2 time domain symbols, and it is located on the time domain symbol prior to the guard period (GP) in a slot. The long feedback channel usually occupies all the time domain symbols available for sidelink transmission in a slot, in other words, the long feedback channel occupies all the time domain symbols available for sidelink transmission other than the guard period in a time slot. For example, as shown in FIG. 7, usually the first symbol in a slot is used as automatic gain control (AGC), and the last symbol is used as GP. The long feedback channel can occupy all symbols other than such two symbols in a slot, or the feedback information may also be mapped on the AGC symbol.

Enabling/disabling sidelink feedback means supporting or not supporting sidelink feedback. The second terminal device can transmit or not transmit feedback information for the sidelink data. If it is configured by the network device that sidelink feedback is supported, the second terminal device needs to transmit sidelink feedback information to the first terminal device, otherwise the second terminal device does not transmit sidelink feedback information.

There are usually two feedback modes for the sidelink feedback channel. The first mode is to feed back only NACK, and the second mode is to feed back ACK/NACK. The network device can configure whether the first mode or the second mode is used for feedback. Specifically, in the first mode, if the first terminal device and the second terminal device meet a preset threshold, when the second terminal device have not received the sidelink data correctly, the second terminal device transmits feedback information to the first terminal device, where the feedback information may be NACK; when the second terminal device have received the sidelink data correctly, no feedback information is transmitted to the first terminal device. However, if the first terminal device and the second terminal device do not meet the preset threshold, the second terminal device does not transmit feedback information to the first terminal device. That is, when the preset threshold is met, NACK is fed back if the detection result of the second terminal device is NACK, and no feedback information is transmitted if the detection result of the second terminal device is ACK. However, if the preset threshold is not met, the second terminal device does not transmit feedback information.

The preset threshold may be configured by the network device. Optionally, the preset threshold may be pre-configured, for example, it may be stipulated by protocols. Optionally, the preset threshold may also be determined according to the quality of service (QoS) parameters of the service.

The preset threshold may be a distance threshold to determine whether the distance between the first terminal device and the second terminal device meets the distance threshold. For example, if the distance between the first terminal device and any second terminal device is less than or equal to the distance threshold, it means that the distance between the first terminal device and the second terminal device meets the distance threshold; otherwise, the distance between the first terminal device and the second terminal device does not meet the distance threshold. Similarly, the preset threshold may also be other parameters, for example, a reference signal received power (RSRP) value, which is not limited to this in embodiments of the present application.

In the second mode, the at least one second terminal device transmits feedback information to the first terminal device according to whether the sidelink data has been correctly received, and the feedback information is ACK or NACK. That is, if the detection result of the second terminal device is NACK, it will feed back NACK, and if the detection result of the second terminal device is ACK, it will feed back ACK.

Figure 8:
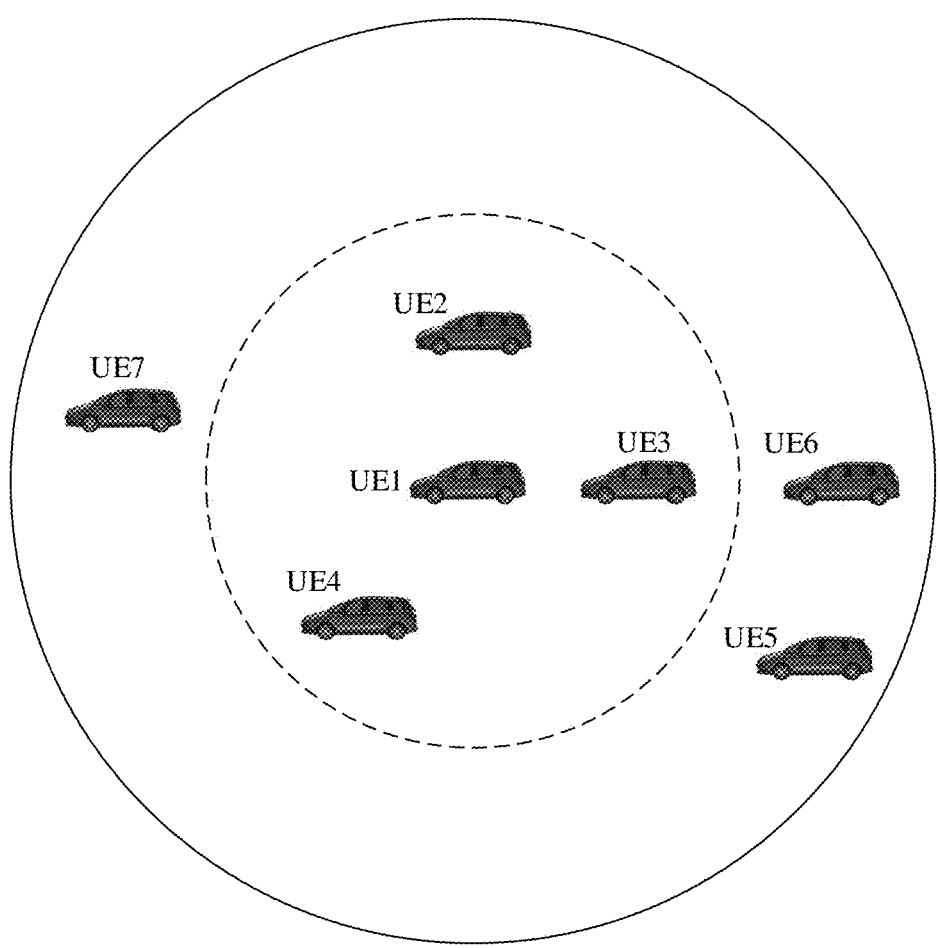
FIG. 8 is a schematic diagram illustrating multicast communication provided by embodiments of the present application.

For example, FIG. 8 is a schematic diagram illustrating any communication group. As shown in FIG. 8, there are 7 UEs in total within the largest circle. It is assumed that UE1 is configured to transmit data and UE2-UE7 are configured to receive data. If the feedback is performed in the first mode, when the distance between each terminal device among the receiving terminal UE2-UE7 and the transmitting terminal UE1 is within a certain preset distance range (for example, for the three terminal devices UE2, UE3, and UE4 in the dotted line, the distance between each terminal device and UE1 is within the preset distance range), then these three terminal devices will give feedback according to a reception state of the sidelink data. That is, if the reception is correct, no information will be fed back, and if the reception is incorrect, these three terminal devices will feedback NACK to UE1. However, for terminal devices outside the preset distance range, that is, UE5, UE6, and UE7, no feedback information is transmitted in any case. If the feedback is performed in the second mode, all the receiving terminals (UE2-UE7) in the group communication transmit feedback information according to the detection state, that is, ACK is fed back to UE1 if the sidelink data has been correctly received, and NACK is fed back to UE1 if the sidelink data is not correctly received.

In embodiments of the present application, the network device allocates the sidelink transmission resource used for transmitting the sidelink data to the first terminal device. If the first terminal device does not transmit reception acknowledgement information to the network device, the network device does not know whether the first terminal device has correctly received the sidelink transmission resource indication information, this is because the first terminal device only transmits sidelink data on the sidelink. Thus, the network device cannot know the status of the sidelink, and cannot know whether the sidelink transmission resource indication information has been correctly received by the first terminal device, so the first terminal device needs to transmit acknowledgement information to the network.

In particular, the sidelink transmission resource indication information transmitted from the network device may further include a second uplink transmission resource indication information. The second uplink transmission resource indication information is used by the first terminal device to determine a second uplink transmission resource. The second uplink transmission resource is used by the first terminal device to transmit feedback information for the sidelink transmission resource indication information to the network device.

For example, the network device may allocate a Physical Uplink Control Channel (PUCCH) transmission resource or a PUSCH transmission resource to the first terminal device, then the first terminal device may transmit the feedback information for the sidelink transmission resource indication information on the PUCCH or PUSCH.

Optionally, if the network device allocates the second uplink transmission resource indication information to the first terminal device, it can implicitly indicate that the first terminal device needs to transmit ACK to the network, and no more explicit indication is needed to indicate that the first terminal device should transmit feedback information to the network device. However, if the network device does not allocate the second uplink transmission resource indication information to the first terminal device, there is no need for the first terminal device to transmit feedback information to the network device. For example, if the sidelink transmission resource indication information includes the second uplink transmission resource indication information, the first terminal device determines the second uplink transmission resource according to the second uplink transmission resource indication information, and transmits feedback information for the sidelink transmission resource indication information to the network device through the second uplink transmission resource, where the feedback information for the sidelink transmission resource indication information is used to indicate whether the sidelink transmission resource indication information has been correctly received by the first terminal device. Otherwise, if the sidelink transmission resource indication information does not include the second uplink transmission resource indication information, it may implicitly indicate that the first terminal device does not need to transmit the feedback information for the sidelink transmission resource indication information to the network device, for example, the second uplink resource indication information may be set as a certain value to indicate that there is no need to transmit feedback information to the network device.

In embodiments of the present application, the network device may further transmit first uplink transmission resource indication information to the first terminal device, where the first uplink transmission resource indication information is used to indicate the first uplink transmission resource, so that the first terminal device can transmit first feedback information to the network device on a first uplink transmission resource, where the first feedback information is used to indicate whether the sidelink data has been correctly received.

In particular, the first uplink transmission resource indication information may be used to determine at least one of the following information: period information of the first uplink transmission resource, slot information of the first uplink transmission resource, and time domain symbol information in the slot of the first uplink transmission resource, the number of time domain symbols occupied by the first uplink transmission resource in the slot, and frequency domain information of the first uplink transmission resource.

The period information of the first uplink transmission resource may be used by the first terminal device to determine the period of the first uplink transmission resource. Optionally, the sidelink transmission resources allocated to the first terminal device by the network device are generally multiple periodic sidelink transmission resources, and a corresponding first uplink transmission resource may be set for each sidelink transmission resource, where the period of the first uplink transmission resource and the corresponding sidelink transmission resource may be set to be the same.

The slot information of the first uplink transmission resource is used to indicate the slot where the first uplink transmission resource is located. For example, the location information can be a slot offset relative to SFN #0 (System Frame Number), or a slot offset relative to PSCCH, PSSCH, or a physical sidelink feedback channel (PSFCH).

Optionally, the first uplink transmission resource indication information is used for determining the slot information of the first uplink transmission resource. Specifically, it can be determined in the following manner: the terminal receives the sidelink transmission resource indication information, transmitted from the network, including the first uplink transmission resource indication information; and the terminal determines the time domain position of the first uplink transmission resource according to the sidelink transmission resource indication information and the first uplink transmission resource indication information.

In particular, the first uplink transmission resource indication information may be time interval indication information. For example, the time interval indicated by the time interval indication information may be a time interval related to the sidelink transmission resource indication information or the sidelink transmission resource. Accordingly, according to the time interval indication information and the sidelink transmission resource indication information, the terminal device may determine the time domain position of the first uplink transmission resource, for example, the position information of the slot where the first uplink transmission resource is located.

For example, for a dynamically scheduled sidelink transmission resource allocation mode, that is, the sidelink transmission resource indication information in the embodiment of the present application is configured through dynamic scheduling, the network can allocate the sidelink transmission resources through DCI. In addition, the transmission resource of the PUCCH may also be indicated in the DCI. The PUCCH is used by the terminal to report sidelink feedback information to the network, that is, the transmission resource of the PUCCH is the first uplink transmission resource in present application. Specifically, the DCI may carry time interval indication information that is used to indicate the time interval between the time domain resource of the PUCCH and the time domain resource of the DCI. Therefore, the terminal can determine, according to the time when the DCI is received and the time interval indication information, the time domain position of the first uplink transmission resource, that is, the time domain position of the PUCCH can be determined.

As another example, the network allocates the type-2 sidelink configured grant to the terminal, that is, the sidelink transmission resource indication information in the embodiment of the application is configured through the type-2 sidelink configured grant where the sidelink transmission resources are configured by the sidelink configured grant through a combination of DCI signaling and the RRC signaling, and the type-2 sidelink configured grant can be activated or deactivated through DCI. In this case, the time interval indication information can be carried in the DCI and/or RRC, and the time interval indication information is used to indicate the time interval between the time domain resource of the PUCCH and the time domain resource of the DCI, that is, the transmission resource of the PUCCH is the first uplink transmission resource in the application. According to the time when the DCI is received and the time interval indication information, the terminal can determine the time domain position of the first uplink transmission resource, that is, the time domain resource of the first PUCCH. Further, since the sidelink configured grant is a periodic transmission resource, that is, the network configures periodic sidelink transmission resources for the terminal, then there is a corresponding PUCCH transmission resource in each sidelink transmission resource period. In this case, the terminal can determine corresponding uplink transmission resources in subsequent sidelink transmission period according to the time domain position of the first PUCCH time domain resource in a period where the first PUCCH time domain resource is located. For example, the terminal receives DCI at slot n to activate the sidelink configured grant, the time interval indication information carried in the DCI is 10 slots and the period includes 100 slots, then the terminal determines the sidelink transmission resource period is [n+1, n+100], [n+101, n+200], [n+201, n+300], and so on. The terminal can determine that the slot for the first uplink transmission resource is n+10, and since the sidelink transmission resource period is 100 slots, the interval between the PUCCH transmission resource in each period is also 100 slots, that is, PUCCHs in the subsequent sidelink transmission resource periods are respectively located in slots n+110, n+210, and so on.

As another example, the network allocates the type-1 sidelink configured grant to the terminal, that is, the sidelink transmission resource indication information in the embodiment of the application is configured through the type-1 sidelink configured grant where the sidelink transmission resources are configured by the sidelink configured grant through the RRC signaling. The time interval indication information is carried in the RRC, and the terminal can determine, according to the time interval indication information, the time domain resource of the first uplink transmission resource, for example, the position information of the slot where the first uplink transmission resource is located. For example, slot offset indication information is included in the RRC signaling, and the slot offset indication information can be used to determine the start position of the sidelink transmission period. The RRC signaling also includes time interval indication information that may be used to indicate the time interval of the first uplink transmission resource relative to the start position of the sidelink transmission period. Therefore, the terminal determines the time domain position of the first uplink transmission resource based on the time interval indication information and the starting position of the sidelink transmission period. Further, since the sidelink configured grant is periodic transmission resources, that is, the network configures periodic sidelink transmission resources for the terminal, and there is a corresponding uplink transmission resource in each sidelink transmission resource period. For example, the first time interval information carried in the RRC signaling is 100 slots, the first time interval information is used to determine the start position of the sidelink transmission resource period, the time domain offset information is relative to SFN #0, and the period information indicated in the RRC signaling is 200 slots. Therefore, it can be determined that the sidelink transmission resource period corresponds to slot [100, 299], [300, 499], [500, 699] . . . and so on, respectively. Second time interval indication information carried in the RRC signaling is 20. The second time interval indication information is used to determine the PUCCH time domain resource. Therefore, the terminal determines that the PUCCH in each period is located at slot: 120, 320, 520, and so on.

The time domain symbol(s) information of the first uplink transmission resource in the slot may be used to indicate the position of the symbol(s) specifically occupied in the slot where the first uplink transmission resource is located. For example, the position information may include the start position or end position of the time domain symbols of the first uplink transmission resource in a slot.

The number information of time domain symbol(s) occupied by the first uplink transmission resource in a slot may be used to indicate the count of time domain symbols occupied by the first uplink transmission resource in one slot.

Optionally, the start position information and the number information of the time domain symbol(s) of the first uplink transmission resource may be indicated by one or more parameters, by which the start position of the time domain symbol(s) can be determined or the number of time domain symbol(s) occupied can be determined. However, the present application is not limited thereto.

The frequency domain information about the first uplink transmission resource may be used to determine the frequency domain resource start position and the frequency domain resource length of the first uplink transmission resource. Optionally, the start position of the frequency domain resource and the length of the frequency domain resource may be determined simultaneously by one parameter, or be indicated by two independent parameters respectively.

Figure 9:
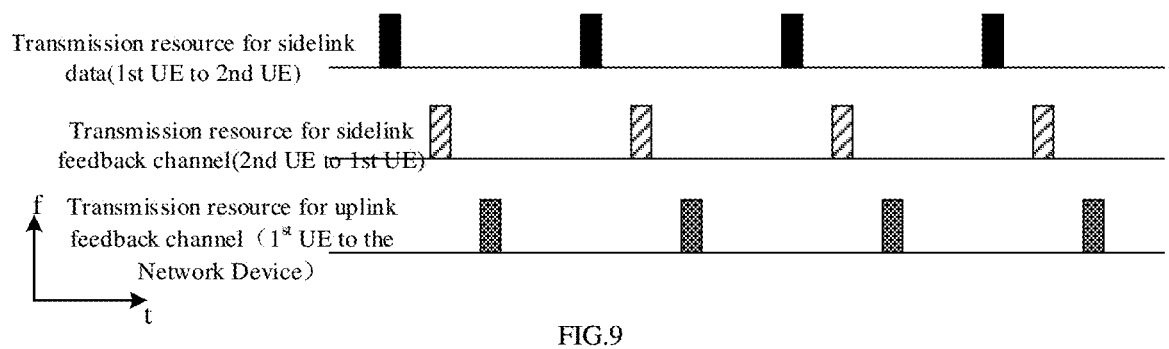
FIG. 9 is a schematic diagram illustrating time-frequency positions of different transmission resources provided by embodiments of the present application.

FIG. 9 is a schematic diagram illustrating time-frequency positions of different transmission resources. As shown in FIG. 9, the network device configures sidelink transmission resources used for transmitting sidelink data for the first terminal device. For example, the sidelink transmission resources may include the transmission resources for the sidelink data in FIG. 9 that can be used by the first terminal device to transmit the sidelink data channel or the sidelink control channel to the second terminal device. The sidelink transmission resources configured by the network device may further include transmission resources for the sidelink feedback channel in FIG. 9 that can be used by the second terminal device to feed back the reception condition of the sidelink data to the first terminal device. In addition, the network device can also allocate the first uplink transmission resource to the first terminal device, that is, the uplink feedback channel transmission resource in FIG. 9. A corresponding uplink feedback channel transmission resource is allocated to each transmission resource of the sidelink data, so that the first terminal device feeds back the reception condition of the sidelink data to the network device. As shown in FIG. 9, the time-frequency positions of the three groups of transmission resources may have a one-to-one correspondence, but the embodiment of the present application is not limited thereto.

It should be understood that the network device may transmit the first uplink transmission resource indication information to the first terminal device by: transmitting configured grant information to the first terminal device, and the configured grant information may include the first uplink transmission resource indication information.

Optionally, the sidelink transmission resource indication information and the first uplink transmission resource indication information transmitted from the network device to the first terminal device may be in the same configured grant information. That is, the network device transmits configured grant information to the first terminal device, and the configured grant information includes the sidelink transmission resource indication information and the first uplink transmission resource indication information.

Optionally, the sidelink transmission resource indication information and the first uplink transmission resource indication information transmitted from the network device to the first terminal device may also be independent signaling, for example, they may be located in different configuration information. For example, the first terminal device receives first configured grant information transmitted from the network device, where the first configured grant information includes the sidelink transmission resource indication information; and the first terminal device receives second configured grant information transmitted from the network device, where the second configured grant information includes the first uplink transmission resource indication information.

The sidelink transmission resource indication information and the first uplink transmission resource indication information may have an association relationship when they are independent signalings. For example, association information may be included in the first configured grant information including the sidelink transmission resource indication information, and/or, the association information may also be included in the second configured grant information including the first uplink transmission resource indication information. The association information is used to indicate that the first uplink transmission resource indication information corresponds to the sidelink transmission resource indication information. As another example, the second configured grant information or the first configured grant information includes indication information used for indicating that the first terminal device transmits first feedback information for the first sidelink data on the first uplink transmission resource information.

Optionally, the network device may also instruct that the first terminal device does not need to perform feedback on the sidelink data, thus the network device does not need to allocate the first uplink transmission resource to the first terminal device. For example, the network device may not transmit the first uplink transmission resource indication information to the first terminal device, which is used to implicitly indicate that the first terminal device does not need to feed back the reception status of the sidelink data to the network device; or, the network device may also transmit indication information to the first terminal device, and the indication information is used to indicate that the first terminal device does not need to feed back the reception status of the sidelink data to the network device, and the embodiment of the present application is not limited thereto.

As shown in FIG. 4, the method 200 further includes S220. In S220, the sidelink data is transmitted on the sidelink transmission resource, that is, the first terminal device transmits the sidelink data to at least one second terminal device on the sidelink transmission resource. Specifically, when there is sidelink sata (for example, the sidelink data may include a sidelink data channel and/or a sidelink control channel, that is, the sidelink data may include PSCCH and/or PSSCH) to be transmitted by the first terminal device, the first terminal device may select a transmission resource from the sidelink transmission resource configured by the network device to transmit the sidelink data, and transmit the sidelink data according to the transmission resource and transmission parameters corresponding to the sidelink transmission resource indication information.

For example, the first terminal device transmits, on the sidelink transmission resource, sidelink control information (SCI) to the at least one second terminal device, and the sidelink control information is used to schedule the sidelink data channel. The first terminal device may also transmit the sidelink data channel through the sidelink transmission resource.

Optionally, the sidelink control information further includes at least one of the following information: HARQ process information, new data indication (NDI) information, and parameter information of the sidelink feedback channel, where the sidelink feedback channel is used to carry feedback information for the sidelink data channel.

Optionally, the first terminal device transmits sidelink data such as the sidelink control channel or the sidelink data channel to the second terminal device through the sidelink transmission resource, and the second terminal device may also feedback the reception status of the sidelink data to the first terminal device.

Figure 10:
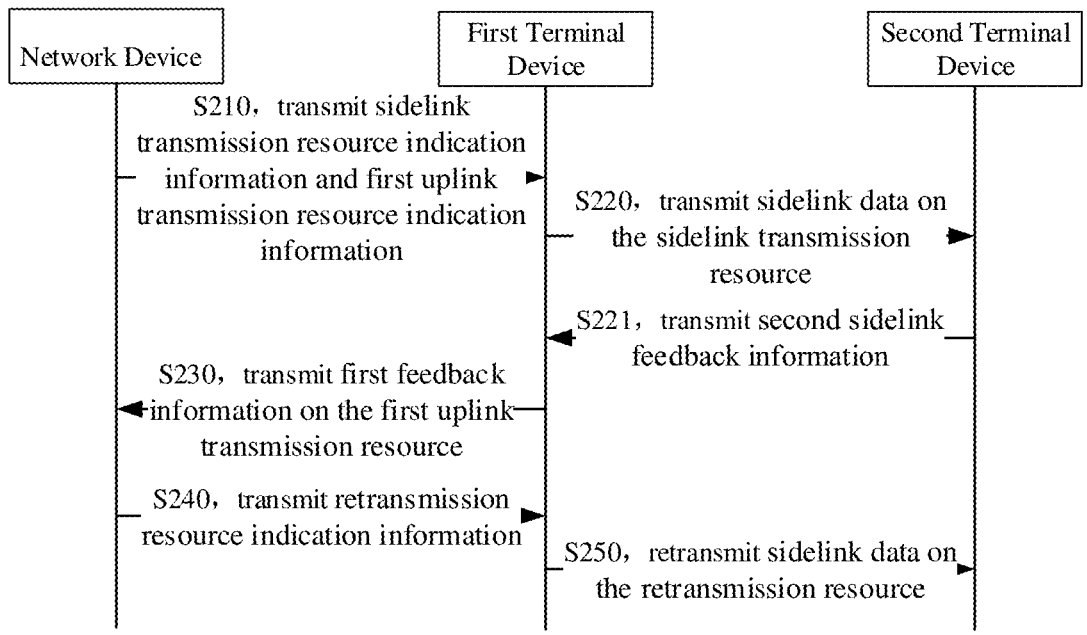
FIG. 10 is another schematic flowchart illustrating a method for transmitting sidelink data provided by embodiments of the present application.

FIG. 10 is another schematic flowchart of a method 200 according to embodiments of the present application. As shown in FIG. 10, after S220, the method 200 may further include step S221. In S221, second sidelink feedback information is transmitted, that is, the second terminal device transmits the second feedback information to the first terminal device, so that the first terminal device receives the second feedback information transmitted from at least one second terminal device. The second feedback information is used to indicate whether the sidelink data has been received correctly. For example, the second feedback information is ACK or NACK.

Optionally, the second terminal device may transmit the second feedback information by using the sidelink transmission resource configured by the network device. However, since the sidelink transmission resource indication information that may include the parameter information of the sidelink feedback channel is transmitted to the first terminal device by the network device, the first terminal device may transmit the parameter information of the sidelink feedback channel to the second terminal device so that the second terminal device can transmit the sidelink feedback channel through the sidelink transmission resource.

Optionally, the parameter information of the sidelink feedback channel transmitted from the first terminal device to the second terminal device may include all or part of the parameter information of the sidelink feedback channel transmitted from the network device to the first terminal device. Therefore, the parameter information of the sidelink feedback channel transmitted from the first terminal device to the second terminal device may include the same information as the parameter information of the sidelink feedback channel transmitted from the network device to the first terminal device. For brevity, details are not repeated here.

For example, the second terminal device determines the sidelink feedback channel according to the sidelink feedback channel parameter information transmitted from the first terminal device to the second terminal device, and feedback the reception conditions of the sidelink data to the first terminal device through the sidelink feedback channel. The parameter information of the sidelink feedback channel may include at least one of the following information: the time offset of the sidelink feedback channel relative to the sidelink data channel or the sidelink control channel; slot parameters of the sidelink feedback channel; frequency domain resource parameters of the sidelink feedback channel; information about whether to enable the sidelink feedback; the feedback mode of the sidelink feedback channel, and the format of the sidelink feedback channel.

The second terminal device transmits the second feedback information to the first terminal device through the sidelink transmission resource. Through the second feedback information, the first terminal device can determine whether the sidelink data has been correctly received. Specifically, if multiple second feedback information fed back by at least one second terminal device include ACK and NACK, or all the second feedback information transmitted from at least one second terminal device to the first terminal device is NACK, then the first terminal device can determine that the sidelink data has not been received correctly, that is, there is a second terminal device/second terminal devices that does not correctly receive the sidelink data among the at least one second terminal device. If all the received second feedback information transmitted from the second terminal devices among the at least one second terminal device is the ACK, the first terminal device can determine that the sidelink data has been correctly received, that is, each second terminal device among the at least one second terminal device receives the sidelink data correctly. If the first terminal device determines that there is discontinuous transmission (DTX) in the second feedback information transmitted from the at least one second terminal device, the first terminal device can determine the sidelink data has not been received correctly, that is, there is a second terminal device that does not correctly receive the sidelink data among the at least one second terminal device.

As shown in FIG. 4 or FIG. 10, the method 200 further includes step S230. In step S230, first feedback information is transmitted on the first uplink transmission resource, that is, the first terminal device transmits, on the first uplink transmission resource indicated by the first uplink transmission resource indication information, the first feedback information to the network device. The first feedback information is used to indicate whether the sidelink data has been received correctly.

Optionally, the first terminal device may determine the first feedback information according to the received second feedback information transmitted from the second terminal device. The first terminal device determines whether the sidelink data has been received correctly according to the second feedback information. If the sidelink data has not been received correctly, the first terminal device determines that the first feedback information is used to indicate the sidelink data has not been received correctly. If the sidelink data has been received correctly, the first terminal device determines that the first feedback information is used to indicate that the sidelink data has been correctly received. Alternatively, in the case that the sidelink data has been correctly received, the first terminal device does not transmit the first feedback information to the network device. The first terminal device may determine whether the sidelink data has been correctly received according to the second feedback information, as described in step S221.

Optionally, the network device receives the first feedback information transmitted from the first terminal device, and can determine the HARQ process information of the sidelink according to the first uplink transmission resource configured by the network device. Alternatively, the HARQ process information of the sidelink may also be transmitted to the network device by the first terminal device.

It should be understood that the first terminal device may transmit, on the first uplink transmission resource, the first feedback information to the network device by: transmitting PUCCH or PUSCH to the network device on the first uplink transmission resource, where the PUCCH or PUSCH includes the first feedback information. Specifically, the first uplink transmission resource indication information transmitted to the first terminal device from the network device may be used by the first terminal device to determine the transmission resource of the PUCCH, and the first terminal device may transmit the PUCCH to the network on the first uplink transmission resource. The PUCCH carries the first feedback information of the sidelink data, such as ACK or NACK.

Optionally, if the first feedback information indicates that the sidelink data has not been received correctly, as shown in FIG. 10, the method 200 may further include steps S240, S250. In step S240, retransmission resource indication information is transmitted, that is, the network device transmits the retransmission resource indication information to the first terminal device, so that the first terminal device receives the retransmission resource indication information transmitted from the network device, where the retransmission resource indication information is used to indicate retransmission resources. In step S250, the sidelink data is retransmitted on the retransmission resource, that is, the first terminal device retransmits the sidelink data to at least one second terminal device on the retransmission resource.

Optionally, the network device may allocate retransmission resources to the first terminal device through dynamic signaling, such as DCI, that is, the DCI includes retransmission resource indication information for the first terminal device to retransmit sidelink data. The retransmission resource indication information or DCI may include sidelink process information. The sidelink process information is used to indicate the retransmission resource allocated by the retransmission resource indication information or the DCI is used for retransmission which HARQ process.

Optionally, when the first terminal device performs sidelink data retransmission through the retransmission resource, the first terminal device may transmit the SCI to the second terminal device, so as to schedule the sidelink data channel through the SCI. The SCI may include HARQ process information and NDI indication information, and the NDI is not inverted to indicate retransmission.

Therefore, in the method for transmitting sidelink data provided by the embodiments of the present application, the sidelink transmission resources allocated by the network device to the terminal device are only used for new data transmission of the sidelink data, and the side-line data is configured on the side line. While configuring the sidelink transmission resource for the sidelink data, the network device also configure the transmission resource for transmitting the feedback information for the sidelink data for the terminal device, so that the terminal device can feedback the transmission status of the sidelink data to the network device. When the terminal device needs to retransmit the sidelink data, the network device can dynamically allocate retransmission resources through which retransmission is realized. As a result, the resource utilization is improved, and all sidelink transmission resources are allocated by network device, which can reduce interference.

Embodiments of the application further propose a method for transmitting sidelink data, in which the network device allocates the sidelink transmission resource to the terminal device, and the terminal device transmits the sidelink data on the sidelink transmission resource. If retransmission is required, a resource can be selected from the sidelink transmission resource for retransmission.

Figure 11:
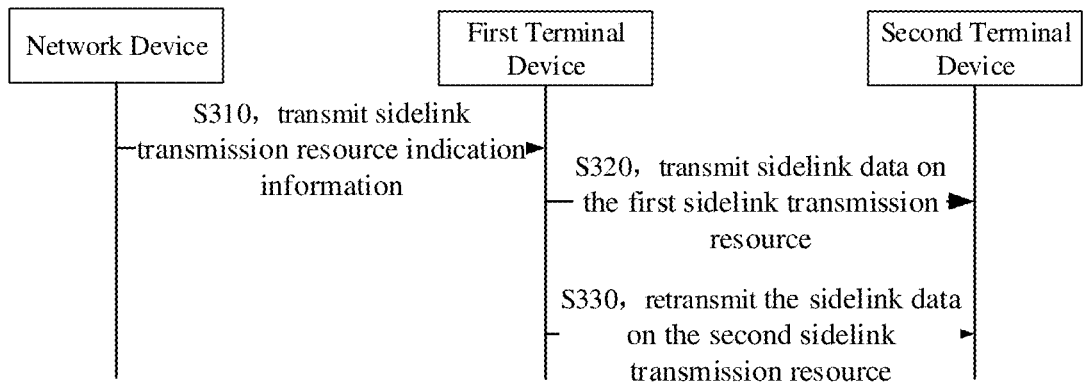
FIG. 11 is another schematic flowchart illustrating a method for transmitting sidelink data provided by embodiments of the present application.

In particular, FIG. 11 is a schematic flowchart illustrating another method 300 for transmitting sidelink data provided by embodiments of the present application. As shown in FIG. 11, the method 300 includes step S310. In step S310, sidelink transmission resource indication information is transmitted. The first terminal device receives the sidelink transmission resource indication information configured by the network device. The sidelink transmission resource indication information is used to indicate a sidelink transmission resource set.

Figure 12:
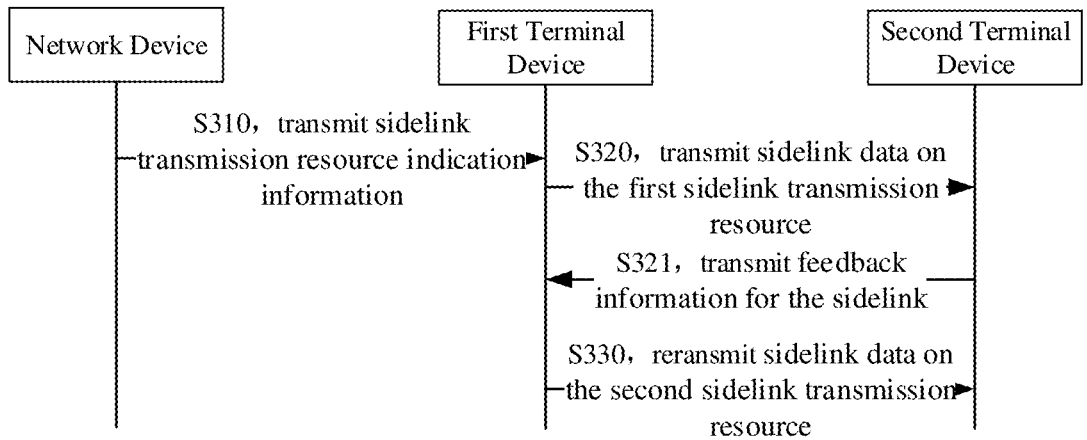
FIG. 12 is another schematic flowchart illustrating a method for transmitting sidelink data provided by embodiments of the present application.

It should be understood that the network device in the method 300 may be any network device, for example, the network device shown in FIG. 1, and the first terminal device in the method 300 may be any terminal device, for example, the terminal device shown in FIG. 1. In order to facilitate distinguishing the terminal devices, as shown in FIG. 12, the second terminal device is a receiving end in the sidelink data transmission process. Among them, considering that there may be one or more terminal devices at the receiving end of sidelink data, for example, during unicast transmission, a terminal device at the transmitting end corresponds to one terminal device at the receiving end; while during multicast transmission, a terminal device at the transmitting end may correspond to multiple terminal devices at the receiving end. Therefore, the second terminal device may refer to any terminal device at the receiving end, or the second terminal device may also refer to multiple terminal devices at the receiving end, which is not limited in the embodiments of the application.

In the embodiment of the present application, the network device transmits the sidelink transmission resource indication information to the first terminal device, so as to indicate the sidelink transmission resource set. The sidelink transmission resource in the sidelink transmission resource set can be used for data transmission between the first terminal device and the second terminal device, for example, can be used to transmit at least one of a sidelink data channel, a sidelink control channel, and a sidelink feedback channel. Specifically, the sidelink transmission resource set can be configured in a dynamic configuration mode, or can also be configured in a semi-static mode.

It should be understood that S310 in method 300 may correspond to the process of S210 in method 200, in which the network device transmits the sidelink transmission resource indication information to the first terminal device. For brevity, details are not described herein.

or example, as for the mode in which the network device transmits the sidelink transmission resource indication information and the parameters included in the sidelink transmission resource indication information, reference may be made to the description of the corresponding part in S210. For example, the sidelink transmission resource indication information in S310 may include at least one of the following information: parameter information of the sidelink data channel, parameter information of the sidelink control channel, parameter information of the sidelink feedback channel, and uplink transmission resource indication information, where the uplink transmission resource indication information corresponds to the second uplink transmission resource indication information in S210 in method 200, which is not repeated here for brevity.

In order to facilitate the distinction, the sidelink transmission resources indicated by the sidelink transmission resource indication information in method 300 are referred to as a sidelink transmission resource set, and the sidelink transmission resources in the sidelink transmission resource set are used for the data transmission between the first terminal device and the second terminal device.

It should be understood that the difference between S310 of method 300 and S210 of method 200 lies in that the network device does not allocate the first uplink transmission resource, through which the sidelink feedback information is transmitted to the network device, to the first terminal device. In other words, the network device does not transmit the first uplink transmission resource indication information to the first terminal device. Therefore, the first terminal device does not need to transmit the sidelink feedback information to the network device.

As shown in FIG. 11, the method 300 further includes step S320. In step S320, the sidelink data is transmitted on the first sidelink transmission resource, that is, the first terminal device transmits, on the first sidelink transmission resource in the sidelink transmission resource set, the sidelink data to at least one second terminal device.

It should be understood that S320 in the method 300 may correspond to S220 in the method 200, that is, the S320 is applicable to the description of S220, where the first terminal device transmits the sidelink data on the first sidelink transmission resource, and the first sidelink transmission resource may correspond to the sidelink transmission resource in S220 in the method 200. For brevity, details are not described herein.

For example, the sidelink data may include PSCCH and PSSCH. The first terminal device may transmit the SCI to the second terminal device, and the SCI is used to schedule the sidelink data channel. Optionally, the SCI may include parameter information of the sidelink feedback channel. Optionally, the SCI may also carry HARQ process information and NDI indication information.

Further, FIG. 12 is another schematic flowchart of a method 300 according to an embodiment of the present application. As shown in FIG. 12, the method 300 may further include step S321 after step S320. In step S321, feedback information for the sidelink data is transmitted, that is, the second terminal device transmits the feedback information to the first terminal device, so that the first terminal device receives the feedback information transmitted from at least one second terminal device. The feedback information is used to indicate whether the sidelink data has been received correctly. For example, the feedback information is ACK or NACK.

It should be understood that S321 in the method 300 may correspond to S221 in the method 200, that is, the S321 is applicable to the description of S221. The first terminal device may transmit the feedback information on part of sidelink transmission resources in the sidelink transmission resource set. The description of such part of the sidelink transmission resources may correspond to the description of the sidelink transmission resource used to transmit the second feedback information in S220 in method 200. In addition, the feedback information in S321 corresponds to the second feedback information in S221. For the sake of brevity, description of feedback information in S321 is not repeated here.

Optionally, if the first terminal device determines, according to the feedback information for the sidelink data fed back by the second terminal device, that the sidelink data has not been received correctly, the method 300 may further include step S330, as shown in FIG. 11 and FIG. 12. In step S330, the sidelink data is retransmitted on the second sidelink transmission resource, that is, if the sidelink data is not correctly received, the first terminal device retransmits, on the second sidelink transmission resource in the sidelink transmission resource set, the sidelink data to at least one second terminal device.

Figure 13:
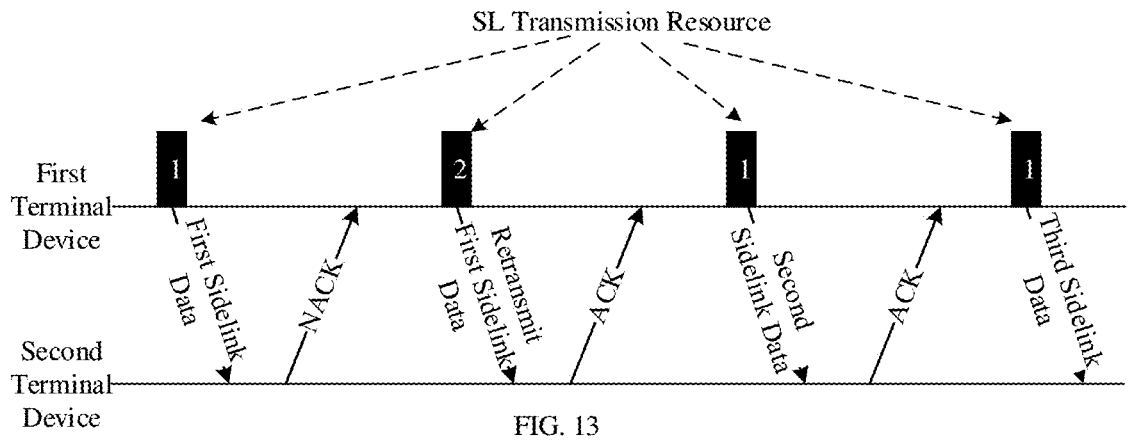
FIG. 13 is a schematic diagram illustrating sidelink data transmission provided by embodiments of the present application.

For example, FIG. 13 is a schematic diagram illustrating sidelink data transmission provided by embodiments of the present application. As shown in FIG. 13, all the black blocks belong to the sidelink transmission resource set configured by the network device. Assuming that the first terminal device transmits the first sidelink data to the second terminal device on the resource corresponding to the first black block, then the resource corresponding to the first black block belongs to the first sidelink transmission resource in the sidelink transmission resource set. Next, assuming that the first terminal device receives the feedback information for the first sidelink data transmitted from the second terminal device and the feedback information is NACK, then the first terminal device can retransmit, on the resource corresponding to the second black block, the first sidelink data to the second terminal device, where the second black block belongs to the second sidelink transmission resource in the sidelink transmission resource set. Assuming that the first terminal device receives the feedback information of the retransmission data for the first sidelink data from the second terminal device and the feedback information is ACK, then the first terminal device no longer needs to retransmit the first sidelink data.

In addition, assuming that the first terminal device needs to transmit second sidelink data to the second terminal device on the resource corresponding to the third black block, then the resource corresponding to the third black block also belongs to the first sidelink transmission resource in the sidelink transmission resource set. Next, assuming that the first terminal device receives the feedback information for the second sidelink data transmitted from the second terminal device and the feedback information is ACK, then the first terminal device no longer needs to retransmit the second sidelink data. Then, the first terminal device can proceed with transmission of other sidelink data, for example, it can also transmit the third sidelink data on the resource corresponding to the fourth black block, and so on, where the resource corresponding to the fourth black block also belongs to the first sidelink transmission resource in the sidelink transmission resource set.

Therefore, according to the method for transmitting sidelink data provided in the embodiment of the present application, the sidelink transmission resources configured by the network device for the terminal device can be used by the terminal device to perform initial transmission of the sidelink data, or it can be used for retransmission of the sidelink data. The terminal device autonomously selects resources used for initial transmission and retransmission among the configured sidelink transmission resources, which can reduce signaling overhead with network device.

Embodiments of the application further propose a method for transmitting sidelink data, in which the network device allocates the sidelink transmission resource to the terminal device, and the terminal device transmits the sidelink data on the sidelink transmission resource. If retransmission is required, the terminal device can acquire a transmission resource in a resource pool to perform data retransmission.

Figure 14:
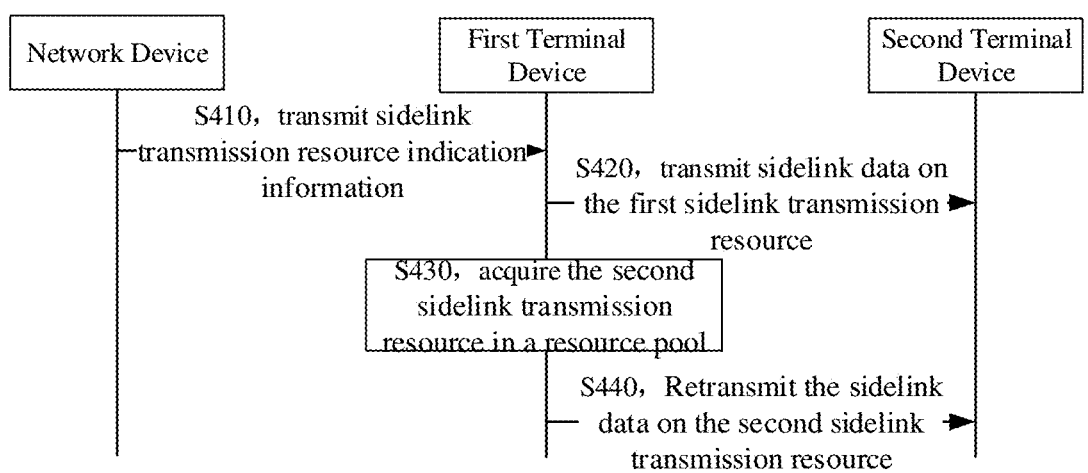
FIG. 14 is yet another schematic flowchart illustrating a method for transmitting sidelink data provided by embodiments of the present application.

In particular, FIG. 14 is a schematic flowchart illustrating a method 400 for transmitting sidelink data according to embodiments of the application. As shown in FIG. 14, the method 400 may include steps described below. In S410, sidelink transmission resource indication information is transmitted, that is, the network device transmits the sidelink transmission resource indication information to the first terminal device, the first terminal device receives the sidelink transmission resource indication information configured by the network device. The sidelink transmission resource indication information is used to determine the first sidelink transmission resource.

It should be understood that the network device in the method 400 may be any network device, for example, the network device shown in FIG. 1, and the first terminal device in the method 400 may be any terminal device, for example, the terminal device shown in FIG. 1, the first terminal device is the transmitting end in the sidelink data transmission process. In order to facilitate distinguishing the terminal devices, as shown in FIG. 14, the second terminal device is a receiving end in the sidelink data transmission process. Among them, considering that there may be one or more terminal devices at the receiving end of sidelink data, for example, during unicast transmission, a terminal device at the transmitting end corresponds to one terminal device at the receiving end; while during multicast transmission, a terminal device at the transmitting end may correspond to multiple terminal devices at the receiving end. Therefore, the second terminal device may refer to any terminal device at the receiving end, or the second terminal device may also refer to multiple terminal devices at the receiving end, which is not limited in the embodiments of the application.

In the embodiment of the present application, the network device transmits the sidelink transmission resource indication information to the first terminal device, so as to indicate the sidelink transmission resource. The sidelink transmission resource can be used for data transmission between the first terminal device and the second terminal device, for example, can be used to transmit at least one of a sidelink data channel, a sidelink control channel, and a sidelink feedback channel. Specifically, the first sidelink transmission resources can be configured in a dynamic configuration mode, or can also be configured in a semi-static mode.

It should be understood that S410 in method 400 may correspond to the process of S210 in method 200, in which the network device transmits the sidelink transmission resource indication information to the first terminal device. For brevity, details are not described herein.

For example, as for the mode in which the network device transmits the sidelink transmission resource indication information and the parameters included in the sidelink transmission resource indication information, reference may be made to the description of the corresponding part in S210. For example, the sidelink transmission resource indication information in S410 may include at least one of the following information: parameter information of the sidelink data channel, parameter information of the sidelink control channel, parameter information of the sidelink feedback channel, and uplink transmission resource indication information, where the uplink transmission resource indication information corresponds to the second uplink transmission resource indication information in S210 in method 200, which is not repeated here for brevity.

In order to facilitate the distinction, the sidelink transmission resources indicated by the sidelink transmission resource indication information in method 400 are referred to as first sidelink transmission resources, and the first sidelink transmission resources are used for the data transmission between the first terminal device and the second terminal device.

It should be understood that the difference between S410 of method 400 and S210 of method 200 lies in that the network device does not allocate the first uplink transmission resource, through which the sidelink feedback information is transmitted to the network device, to the first terminal device. In other words, the network device does not transmit the first uplink transmission resource indication information to the first terminal device. Therefore, the first terminal device does not need to transmit the sidelink feedback information to the network device.

As shown in FIG. 14, the method 400 further includes step S420. In step S420, the sidelink data is transmitted on the first sidelink transmission resource, that is, the first terminal device transmits, on the first sidelink transmission resource, the sidelink data to at least one second terminal device.

It should be understood that S420 in the method 400 may correspond to S220 in the method 200, that is, the S420 is applicable to the description of S220, where the first terminal device transmits the sidelink data on the first sidelink transmission resource, and the first sidelink transmission resource corresponds to the sidelink transmission resource in S220 in the method 200. For brevity, details are not described herein.

For example, the sidelink data may include PSCCH and PSSCH. The first terminal device may transmit the SCI to the second terminal device, and the SCI is used to schedule the sidelink data channel. Optionally, the SCI may include parameter information of the sidelink feedback channel. Optionally, the SCI may also carry HARQ process information and NDI indication information.

Figure 15:
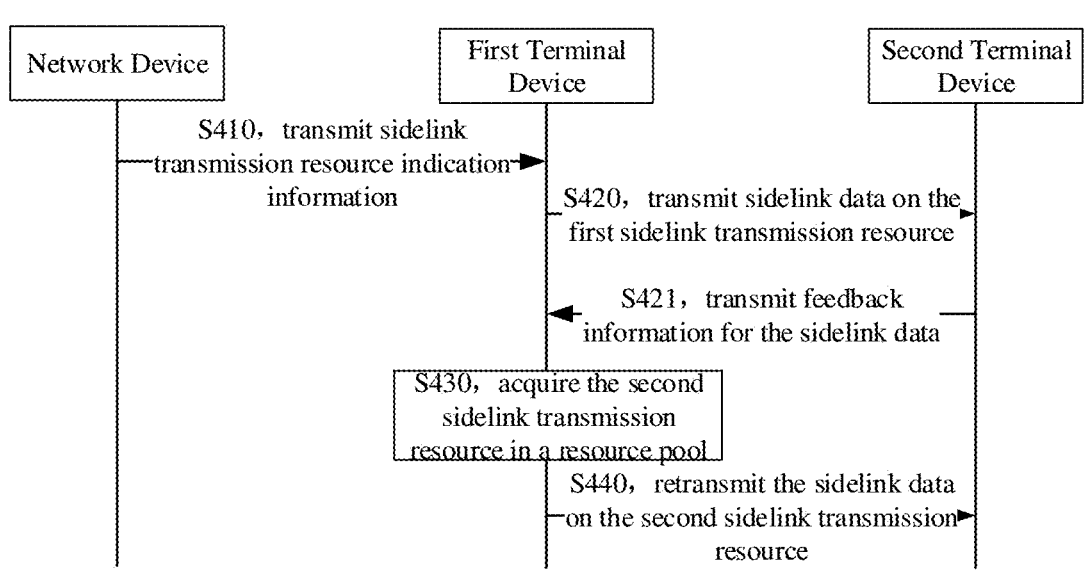
FIG. 15 is yet another schematic flowchart illustrating a method for transmitting sidelink data provided by embodiments of the present application.

Further, FIG. 15 is another schematic flowchart of the method 400 according to embodiments of the present application. As shown in FIG. 15, after S420, the method 400 may further include step S421. In S421, feedback information for the sidelink data is transmitted, that is, the second terminal device transmits the second feedback information to the first terminal device, so that the first terminal device receives the feedback information for the sidelink data transmitted from at least one second terminal device. The first terminal determines whether the sidelink data has been received correctly according to the feedback information. For example, the feedback information is ACK or NACK.

It should be understood that S421 in the method 400 may correspond to S221 in the method 200, that is, the S421 is applicable to the description of S221. The first terminal device may transmit the feedback information on part of sidelink transmission resources in the first sidelink transmission resources. The description of such part of the sidelink transmission resources may correspond to the description of the sidelink transmission resource used to transmit the second feedback information in S220 in method 200. In addition, the feedback information in S421 corresponds to the second feedback information in S221. For the sake of brevity, description of feedback information in S421 is not repeated here.

Optionally, if the first terminal device determines that the sidelink data has not been received correctly according to the feedback information for the sidelink data fed back by the second terminal device, the method 400 may further include steps S430~S440, as shown in FIG. 14 and FIG. 15. In S430, the second sidelink transmission resource is acquired in a resource pool.

In S440, the sidelink data is retransmitted on the second sidelink transmission resource. Specifically, if determining that the sidelink data has not been received correctly, the first terminal device acquires resource pool configuration information, and determines the resource pool according to the resource pool configuration information; the first terminal device retransmits the sidelink data to at least one second terminal device on the second sidelink transmission resource in the resource pool.

Optionally, the method 400 may further include a step in which the terminal device acquires the second sidelink transmission resource in the resource pool. Further, the second sidelink transmission resource is acquired as follows: the first terminal device acquires the second sidelink transmission resource from the resource pool by listening to the resources; or, the first terminal device randomly selects a transmission resource in the resource pool as the second sidelink transmission resource.

Optionally, the listening process may include detecting PSCCH, performing RSRP measurement, etc., where the RSRP measurement may refer to measuring PSCCH-RSRP or PS SCH-RSRP, and the embodiment of the present application is not limited thereto.

Figure 16:
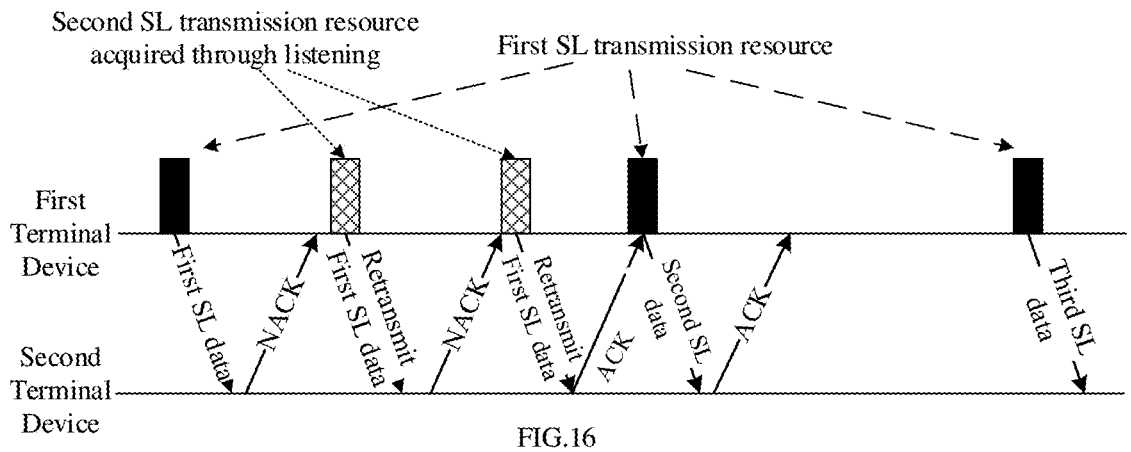
FIG. 16 is another schematic diagram illustrating sidelink data transmission provided by embodiments of the present application.

For example, FIG. 16 is a schematic diagram illustrating another sidelink data transmission provided by embodiments of the present application. As shown in FIG. 16, resources corresponding to the black block belong to the first sidelink transmission resources configured by the network device, and resources corresponding to blocks with diagonal squares belong to the second sidelink transmission resources in the resource pool. Herein, assuming that the first terminal device transmits the first sidelink data to the second terminal device on the resource corresponding to the first black block, and the resource corresponding to the first black block belongs to the first sidelink transmission resource. Next, assuming that the first terminal device receives the feedback information for the first sidelink data from the second terminal device and the feedback information is NACK, then the first terminal device may acquire the second sidelink transmission resource in the resource pool, for example, the resource corresponding to the second block is acquired by listening in the resource pool, and the first sidelink data is retransmitted to the second terminal device on the resource. The second block belongs to the second sidelink transmission resource. If the first terminal device receives the feedback information for the retransmission data of the first sidelink data from the second terminal device and the feedback information is ACK, the first terminal device no longer need to retransmit the first sidelink data. However, if the first terminal device receives the feedback information for the retransmission data of the first sidelink data from the second terminal device and the feedback information is still NACK, then the first terminal device may acquire the second sidelink transmission resource in the resource pool, for example, the resource corresponding to the third block is acquired by listening in the resource pool, and the first sidelink data is retransmitted to the second terminal device on the resource. The third block belongs to the second sidelink transmission resource. By analogy, the first sidelink data is stopped from being transmitted until the first terminal device receives the feedback information for the retransmitted data of the first sidelink data and the feedback information is ACK, or the maximum number of retransmissions is reached.

Further, assuming that the first terminal device needs to transmit the second sidelink data to the second terminal device on the resource corresponding to the fourth black block, and the resource corresponding to the fourth black block also belongs to the first sidelink transmission resource.

Next, assuming that the first terminal device receives the feedback information for the second sidelink data from the second terminal device and the feedback information is ACK, the first terminal device does not need to retransmit the second sidelink data. The first terminal device can proceed with transmission of other sidelink data, for example, it can also transmit the third sidelink data on the resource corresponding to the fifth black block, and so on, where the resource corresponding to the fifth black block also belongs to the first sidelink transmission resource.

Therefore, according to the method for transmitting sidelink data provided by the embodiment of the present application, the sidelink transmission resource configured by the network device for the terminal device is used for the initial transmission of the sidelink data. If retransmission is required, the transmission resources of the retransmitted data can be acquired by the terminal device in the resource pool through listening or other means, that is, the initial transmission of sidelink data uses the transmission resources allocated by the network device, and the retransmission of sidelink data uses transmission resources autonomously selected by the terminal device. In this way, when configuring the transmission resources of the sidelink, the network device only needs to consider the initial transmission, and does not need to consider the retransmission, and the signaling overhead between the terminal device and the network device can also be reduced.

It should be understood that in the various embodiments of the present application, the value of the sequence number of the above-mentioned processes does not mean the order of execution, and the execution order of each process should be determined by its function and internal logic, and should not constitute any limitation to the embodiments of the present application.

The method for transmitting sidelink data according to embodiments of the present application is described above in detail with reference to FIGS. 1 to 16. A terminal device and a network device according to embodiments of the present application will be described below with reference to FIGS. 17 to 20.

Figure 17:
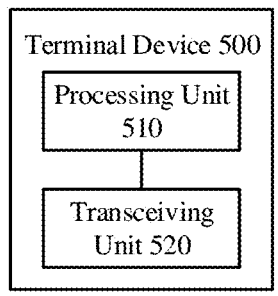
FIG. 17 is a schematic block diagram illustrating a terminal device according to embodiments of the present application.

As shown in FIG. 17, a terminal device 500 according to an embodiment of the present application includes a processing unit 510 and a transceiving unit 520. Optionally, the terminal device 500 may be used to execute the method 200 according to embodiments of the present application.

In particular, the transceiving unit 520 is configured to: receive sidelink transmission resource indication information and first uplink transmission resource indication information configured by a network device, where the sidelink transmission resource indication information is used for indicating the sidelink transmission resource, and the first uplink transmission resource indication information is used for indicating the first uplink transmission resource.

The transceiving unit 520 is further configured to: transmit sidelink data to at least one second terminal device on the sidelink transmission resource. The transceiving unit 520 is further configured to: transmit first feedback information to the network device on the first uplink transmission resource, where the first feedback information is used for indicating whether the sidelink data has been received correctly.

Optionally, as an embodiment, the first uplink transmission resource indication information is used for determining at least one of the following information: period information of the first uplink transmission resource, slot information of the first uplink transmission resource, and time domain symbol information in the slot of the first uplink transmission resource, the number of time domain symbols occupied by the first uplink transmission resource in the slot, and frequency domain information of the first uplink transmission resource.

Optionally, as an embodiment, the first uplink transmission resource indication information is time interval indication information; the processing unit 510 is configured to: determine, according to the time interval indication information and the sidelink transmission resource indication information, slot information of the first uplink transmission resource.

Optionally, as an embodiment, the processing unit 510 is configured to: if the sidelink transmission resource indication information is configured through dynamic scheduling, and the DCI used for the dynamic scheduling includes the time interval indication information, determine the slot information of the first uplink transmission resource according to the time interval indication information and the time information for receiving the DCI.

Optionally, as an embodiment, the processing unit 510 is configured to: if the sidelink transmission resource indication information is configured through type-2 sidelink configured grant, and the RRC or DCI used for the type-2 sidelink configured grant includes the time interval indication information, determine the slot information of the first uplink transmission resource according to the time interval indication information and the time information for receiving the DCI.

Optionally, as an embodiment, the processing unit 510 is configured to: if the sidelink transmission resource indication information is configured through type-1 sidelink configured grant, and the RRC used for the type-1 sidelink configured grant includes the time interval indication information and slot offset indication information, determine starting position of the sidelink transmission resource period according to the slot offset indication information, and determine the slot information of the first uplink transmission resource according to the time interval indication information and the starting position of the sidelink transmission resource period.

Optionally, as an embodiment, the period of the first uplink transmission resource and that of the sidelink transmission resource are the same.

Optionally, as an embodiment, the transceiving unit 520 is configured to: transmit PUCCH or PUSCH to the network device on the first uplink transmission resource, where the PUCCH or PUSCH includes the first feedback information.

Optionally, as an embodiment, the transceiving unit 520 is configured to: receive second feedback information transmitted from at least one second terminal device, where the second feedback information is used for indicating whether the sidelink data has been correctly received.

Optionally, as an embodiment, the processing unit 510 is configured to: determine whether the sidelink data has been received correctly according to the second feedback information. If the sidelink data has not been received correctly, the first feedback information is determined to be used for indicating that the sidelink data has not been received correctly. If the sidelink data is received correctly, the first feedback information is determined to be used for indicating that the sidelink data has been received correctly.

Optionally, as an embodiment, the transceiving unit 520 is configured to: receive retransmission resource indication information transmitted from the network device if the first feedback information indicates that the sidelink data has not been received correctly, where the retransmission resource indication information is used for indicating retransmission resources on which the sidelink data is retransmitted to at least one second terminal device.

Optionally, as an embodiment, the transceiving unit 520 is configured to: receive configured grant information transmitted from the network device, and the configured grant information includes the sidelink transmission resource indication information and the first uplink transmission resource indication information.

Optionally, as an embodiment, the transceiving unit 520 is configured to: receive first configured grant information transmitted from the network device, where the first configured grant information includes the sidelink transmission resource indication information; and receive second configured grant information transmitted from the network device, where the second configured grant information includes the first uplink transmission resource indication information.

Optionally, as an embodiment, the first configured grant information includes associated information, or the second configured grant information includes associated information; where, the associated information is used for indicating that the first uplink transmission resource indication information corresponds to the sidelink transmission resource indication information.

Optionally, as an embodiment, the second configured grant information includes instruction information, and the instruction information is used to instruct the transceiving unit 520 to transmit the first feedback information on the first uplink transmission resource.

Optionally, as an embodiment, the sidelink transmission resource is used for transmitting at least one of the following between the terminal device and at least one second terminal device: a sidelink data channel, a sidelink control channel, and a sidelink feedback channel.

Optionally, as an embodiment, the sidelink transmission resource indication information includes at least one of the following information: parameter information of the sidelink data channel, parameter information of the sidelink control channel, parameter information of the sidelink feedback channel, and the second uplink transmission resource indication information.

The parameter information of the sidelink data channel includes at least one of the following information: time domain resource parameters of the sidelink data channel, and frequency domain resource parameter of the sidelink data channel, DMRS, transmission mode, number of transmission layers, MCS, maximum transmission times, redundancy version information, number of HARQ processes, power control information, size of sidelink data, identification information of a terminal device that receives the sidelink data, priority information, time delay information, code block group (CBG) feedback indication, information about whether the sidelink data channel includes CSI-RS, the time domain resource parameter of the CSI-RS, the frequency domain resource parameter of the CSI-RS, and CSI feedback indication information.

The parameter information of the sidelink control channel includes at least one of the following information: time domain resource parameters of the sidelink control channel, frequency domain resource parameters of the sidelink control channel.

The parameter information of the sidelink feedback channel includes at least one of the following information: a time offset of the sidelink feedback channel relative to the sidelink data channel or the sidelink control channel; slot parameters of the sidelink feedback channel; frequency domain resource parameters of the sidelink feedback channel; information on whether the sidelink feedback is enabled, the feedback mode of the sidelink feedback channel, the format of the sidelink feedback channel.

The second uplink transmission resource indication information is used for determining a second uplink transmission resource, and the second uplink transmission resource is used by the transceiving unit 520 to transmit feedback information for the sidelink transmission resource indication information to the network device.

Optionally, as an embodiment, the transceiving unit 520 is configured to transmit sidelink control information to at least one second terminal device on the sidelink transmission resource, where the sidelink control information is used to schedule the sidelink data channel.

Optionally, as an embodiment, the sidelink control information further includes at least one of the following information: HARQ process information, NDI information, and parameter information of the sidelink feedback channel, where the sidelink feedback channel is used to carry feedback information for the sidelink data channel.

Optionally, as an embodiment, the format of the sidelink feedback channel includes: a short feedback channel and a long feedback channel.

Optionally, as an embodiment, the short feedback channel occupies one or two time domain symbols in a slot, and the time domain symbol(s) occupied by the short feedback channel is located prior to the time domain symbol occupied by the guard period; or, the long feedback channel occupies all time-domain symbols, that can be used for sidelink transmission, other than the guard period in a slot.

Optionally, as an embodiment, the feedback mode of the sidelink feedback channel includes a first mode and a second mode. In the first mode, if the terminal device and the second terminal device meet a preset threshold, the second terminal device transmits feedback information to the terminal device when having not received the sidelink data correctly, where the feedback information is NACK information; and the second terminal device does not transmit feedback information to the terminal device when having received the sidelink data correctly. If the terminal device and the second terminal device do not meet the preset threshold, the second terminal device does not transmit feedback information to the terminal device. In the second mode, the at least one second terminal device transmits the feedback information to the terminal device according to whether the sidelink data has been correctly received by the second terminal device, where the feedback information is ACK information or NACK information.

Optionally, as an embodiment, the processing unit 510 is configured to: if the sidelink transmission resource indication information includes the second uplink transmission resource indication information, determine the second uplink transmission resource according to the second uplink transmission resource indication information, and the feedback information for the sidelink transmission resource indication information is transmitted by the transceiving unit 520, on the second uplink transmission resource, to the network device, and the feedback information for the sidelink transmission resource indication information is used for indicating whether the sidelink transmission resource indication information has been correctly received by the transceiving unit 520.

It should be understood that the above and other operations and/or functions of each unit in the terminal device 500 can be used to implement the corresponding processes of the terminal device in the method 200 shown in FIGS. 4-10, which is not described here for the sake of brevity.

Therefore, in the terminal device provided by the embodiments of the present application, the sidelink transmission resources allocated to the terminal device by the network device are only used for new data transmission of the sidelink data. Moreover, the terminal device also receives the transmission resource of the feedback information for the sidelink data, transmitted from the network device, while receiving the sidelink transmission resource for the sidelink data, configured by the network device. Thus, the terminal device can feedback the transmission status of the sidelink data to the network device. When the terminal device needs to retransmit the sidelink data, the network device can dynamically allocate retransmission resources through which retransmission is realized. As a result, the resource utilization is improved, and all sidelink transmission resources are allocated by network device, which can reduce interference.

Optionally, the terminal device 500 may also be used to execute the method 300 of the embodiment of the present application. Specifically, the transceiving unit 520 is configured to: receive the sidelink transmission resource indication information configured by the network device, and the sidelink transmission resource indication information is used to indicate a sidelink transmission resource set. The transceiving unit 520 is further configured to: transmit sidelink data to at least one second terminal device on the first sidelink transmission resource in the sidelink transmission resource set. The transceiving unit 520 is further configured to: retransmit, on the second sidelink transmission resource in the sidelink transmission resource set, the sidelink data to the at least one second terminal device if the sidelink data has not been received correctly.

Optionally, as an embodiment, the transceiving unit 520 is configured to: receive the feedback information transmitted from at least one second terminal device, and the processing unit 510 is configured to determine whether the sidelink data has been correctly received based on the feedback information.

Optionally, as an embodiment, the transceiving unit 520 is configured to: receive configured grant information transmitted from the network device, and the configured grant information includes the sidelink transmission resource indication information.

Optionally, as an embodiment, the first sidelink transmission resource is used for transmitting at least one of the following between the terminal device and at least one second terminal device: a sidelink data channel, a sidelink control channel, and a sidelink feedback channel.

Optionally, as an embodiment, the sidelink transmission resource indication information includes at least one of the following information: parameter information of the sidelink data channel, parameter information of the sidelink control channel, parameter information of the sidelink feedback channel, and the uplink transmission resource indication information.

The parameter information of the sidelink data channel includes at least one of the following information: time domain resource parameters of the sidelink data channel, and frequency domain resource parameters of the sidelink data channel, DMRS, transmission mode, number of transmission layers, MCS, maximum transmission times, redundancy version information, number of HARQ processes, power control information, size of sidelink data, identification information of a terminal device that receives the sidelink data, priority information, time delay information, code block group (CBG) feedback indication, information about whether the sidelink data channel includes CSI-RS, the time domain resource parameter of the CSI-RS, the frequency domain resource parameter of the CSI-RS, and CSI feedback indication information.

The parameter information of the sidelink control channel includes at least one of the following information: time domain resource parameters of the sidelink control channel, frequency domain resource parameters of the sidelink control channel.

The parameter information of the sidelink feedback channel includes at least one of the following information: a time offset of the sidelink feedback channel relative to the sidelink data channel or the sidelink control channel; slot parameters of the sidelink feedback channel; frequency domain resource parameters of the sidelink feedback channel; the format of the sidelink feedback channel; information on whether the sidelink feedback is enabled; and the feedback mode of the sidelink feedback channel.

The uplink transmission resource indication information is used for determining a uplink transmission resource, and the uplink transmission resource is used by the transceiving unit 520 to transmit feedback information for the sidelink transmission resource indication information to the network device.

Optionally, as an embodiment, the transceiving unit 520 is configured to transmit sidelink control information to at least one second terminal device on the first sidelink transmission resource, where the sidelink control information is used to schedule the sidelink data channel.

Optionally, as an embodiment, the sidelink control information includes at least one of the following information: parameter information of the sidelink feedback channel; HARQ process information and NDI information, where the sidelink feedback channel is used to carry feedback information for the sidelink data channel.

Optionally, as an embodiment, the format of the sidelink feedback channel includes: a short feedback channel and a long feedback channel.

Optionally, as an embodiment, the short feedback channel occupies one or two time domain symbols in a slot, and the time domain symbol(s) occupied by the short feedback channel is located prior to the time domain symbol occupied by the guard period; or, the long feedback channel occupies all time-domain symbols, that can be used for sidelink transmission, other than the guard period in a slot.

Optionally, as an embodiment, the feedback mode of the sidelink feedback channel includes a first mode and a second mode. In the first mode, if the terminal device and the second terminal device meet a preset threshold, the second terminal device transmits feedback information to the terminal device when having not received the sidelink data correctly, where the feedback information is NACK information; and the second terminal device does not transmit feedback information to the terminal device when having received the sidelink data correctly. If the terminal device and the second terminal device do not meet the preset threshold, the second terminal device does not transmit feedback information to the terminal device. In the second mode, the at least one second terminal device transmits the feedback information to the terminal device according to whether the sidelink data has been correctly received by the second terminal device, where the feedback information is ACK information or NACK information.

Optionally, as an embodiment, the processing unit 510 is configured to: if the sidelink transmission resource indication information includes the uplink transmission resource indication information, determine the uplink transmission resource according to the uplink transmission resource indication information, and the feedback information for the sidelink transmission resource indication information is transmitted by the transceiving unit 520, on the uplink transmission resource, to the network device, and the feedback information for the sidelink transmission resource indication information is used for indicating whether the sidelink transmission resource indication information has been correctly received by the transceiving unit 520.

It should be understood that the above and other operations and/or functions of each unit in the terminal device 500 can be used to implement the corresponding processes of the terminal device in the method 300 shown in FIGS. 11-13, which is not described here for the sake of brevity.

Therefore, according to the terminal device provided in the embodiment of the present application, the received sidelink transmission resources configured by the network device can be used by the terminal device to perform initial transmission of the sidelink data, or it can be used for retransmission of the sidelink data. The terminal device autonomously selects resources used for initial transmission and retransmission among the configured sidelink transmission resources, which can reduce signaling overhead with network device.

Optionally, the terminal device 500 may also be used to execute the method 400 of the embodiment of the present application. Specifically, the transceiving unit 520 is configured to: receive the sidelink transmission resource indication information configured by the network device, and the sidelink transmission resource indication information is used to determine first sidelink transmission resource. The transceiving unit 520 is further configured to: transmit sidelink data to at least one second terminal device on the first sidelink transmission resource. The transceiving unit 520 is further configured to: acquire resource pool configuration information and determine a resource pool based on the resource pool configuration information, if the sidelink data has not been received correctly. The transceiving unit 520 is further configured to: retransmit, on the second sidelink transmission resource in the resource pool, the sidelink data to the at least one second terminal device.

Optionally, as an embodiment, the processing unit 510 is configured to: obtain the second sidelink transmission resource in the resource pool through resource listening; or, randomly select a transmission resource from the resource pool as the second sidelink transmission resource.

Optionally, as an embodiment, the transceiving unit 520 is further configured to: receive the feedback information transmitted from at least one second terminal device, and the processing unit 510 is further configured to determine whether the sidelink data has been correctly received based on the feedback information.

Optionally, as an embodiment, the transceiving unit 520 is configured to: receive configured grant information transmitted from the network device, and the configured grant information includes the sidelink transmission resource indication information.

Optionally, as an embodiment, the first sidelink transmission resource is used for transmitting at least one of the following between the terminal device and at least one second terminal device: a sidelink data channel, a sidelink control channel, and a sidelink feedback channel.

Optionally, as an embodiment, the first sidelink transmission resource indication information includes at least one of the following information: parameter information of the sidelink data channel, parameter information of the sidelink control channel, parameter information of the sidelink feedback channel, and the uplink transmission resource indication information.

The parameter information of the sidelink data channel includes at least one of the following information: time domain resource parameters of the sidelink data channel, and frequency domain resource parameters of the sidelink data channel, DMRS, transmission mode, number of transmission layers, MCS, maximum transmission times, redundancy version information, number of HARQ processes, power control information, size of sidelink data, identification information of a terminal device that receives the sidelink data, priority information, time delay information, code block group (CBG) feedback indication, information about whether the sidelink data channel includes CSI-RS, the time domain resource parameter of the CSI-RS, the frequency domain resource parameter of the CSI-RS, and CSI feedback indication information.

The parameter information of the sidelink control channel includes at least one of the following information: time domain resource parameters of the sidelink control channel, frequency domain resource parameters of the sidelink control channel.

The parameter information of the sidelink feedback channel includes at least one of the following information: a time offset of the sidelink feedback channel relative to the sidelink data channel or the sidelink control channel; slot parameters of the sidelink feedback channel; frequency domain resource parameters of the sidelink feedback channel; the format of the sidelink feedback channel; information on whether the sidelink feedback is enabled; and the feedback mode of the sidelink feedback channel.

The uplink transmission resource indication information is used for determining a uplink transmission resource, and the uplink transmission resource is used by the transceiving unit 520 to transmit feedback information for the sidelink transmission resource indication information to the network device.

Optionally, as an embodiment, the transceiving unit 520 is configured to transmit sidelink control information to at least one second terminal device on the first sidelink transmission resource, where the sidelink control information is used to schedule the sidelink data channel.

Optionally, as an embodiment, the sidelink control information includes at least one of the following information: parameter information of the sidelink feedback channel; HARQ process information and NDI information, where the sidelink feedback channel is used to carry feedback information for the sidelink data channel.

Optionally, as an embodiment, the format of the sidelink feedback channel includes: a short feedback channel and a long feedback channel.

Optionally, as an embodiment, the short feedback channel occupies one or two time domain symbols in a slot, and the time domain symbol(s) occupied by the short feedback channel is located prior to the time domain symbol occupied by the guard period; or, the long feedback channel occupies all time-domain symbols, that can be used for sidelink transmission, other than the guard period in a slot.

Optionally, as an embodiment, the feedback mode of the sidelink feedback channel includes a first mode and a second mode. In the first mode, if the terminal device and the second terminal device meet a preset threshold, the second terminal device transmits feedback information to the terminal device when having not received the sidelink data correctly, where the feedback information is NACK information; and the second terminal device does not transmit feedback information to the terminal device when having received the sidelink data correctly. If the terminal device and the second terminal device do not meet the preset threshold, the second terminal device does not transmit feedback information to the terminal device. In the second mode, the at least one second terminal device transmits the feedback information to the terminal device according to whether the sidelink data has been correctly received by the at least one second terminal device, where the feedback information is ACK information or NACK information.

Optionally, as an embodiment, the processing unit 510 is further configured to: if the sidelink transmission resource indication information includes the uplink transmission resource indication information, determine the uplink transmission resource according to the uplink transmission resource indication information, and the feedback information for the sidelink transmission resource indication information is transmitted by the transceiving unit 520, on the uplink transmission resource, to the network device, and the feedback information for the sidelink transmission resource indication information is used for indicating whether the sidelink transmission resource indication information has been correctly received by the transceiving unit 520.

It should be understood that the above and other operations and/or functions of each unit in the terminal device 500 can be used to implement the corresponding processes of the terminal device in the method 400 shown in FIGS. 14-16, which are not described here for the sake of brevity.

Therefore, in the terminal device of the embodiment of the present application, the received sidelink transmission resource configured by the network device is used for initial transmission of the sidelink data. If retransmission is required, the resource for retransmitting data can be acquired by the terminal device in the resource pool through listening or in other ways, that is, the initial transmission of sidelink data uses the transmission resources allocated by the network device, and the retransmission uses the transmission resources independently selected by the terminal device. In this way, the network device only needs to consider the initial transmission without considering the retransmission while configuring the transmission resources of the sidelink, the signaling overhead between the terminal device and the network device can also be reduced.

Figure 18:
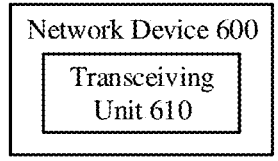
FIG. 18 is a schematic block diagram illustrating a network device according to embodiments of the present application.

As shown in FIG. 18, the network device 600 according to an embodiment of the present application includes a transceiving unit 610. Optionally, the network device 600 may be used to execute the method 200 provided by the embodiment of the present application. In particular, the transceiving unit 610 is configured to: transmit sidelink transmission resource indication information and first uplink transmission resource indication information to the terminal device, where the sidelink transmission resource indication information is used for indicating the sidelink transmission resource that is used for transmitting the sidelink data to at least one second terminal device from the first terminal device, the first uplink transmission resource indication information is used for indicating the first uplink transmission resource. The transceiving unit 610 is further configured to: receive, on the first uplink transmission resource, first feedback information transmitted from the first terminal device, where the first feedback information is used for indicating whether the sidelink data has been received correctly.

Optionally, as an embodiment, the first uplink transmission resource indication information is used by the first terminal device for determining at least one of the following information: period information of the first uplink transmission resource, slot information of the first uplink transmission resource, and time domain symbol information in the slot of the first uplink transmission resource, the number of time domain symbols occupied by the first uplink transmission resource in the slot, and frequency domain information of the first uplink transmission resource.

Optionally, as an embodiment, the first uplink transmission resource indication information is time interval indication information, and the first terminal device is configured to: determine, according to the time interval indication information and the sidelink transmission resource indication information, the slot information of the first uplink transmission resource.

Optionally, as an embodiment, the processing unit 610 is configured to: configure the sidelink transmission resource indication information for the terminal device through dynamic scheduling, where the DCI used for the dynamic scheduling includes the time interval indication information. The first terminal device is configured to determine the slot information of the first uplink transmission resource according to the time interval indication information and the time information for receiving the DCI.

Optionally, as an embodiment, the processing unit 610 is configured to: configure the sidelink transmission resource indication information for the terminal device through type-2 sidelink configured grant, where the DCI or RRC used for the type-2 sidelink configured grant includes time interval indication information. The first terminal device is configured to determine the slot information of the first uplink transmission resource according to the time interval indication information and the time information for receiving the DCI.

Optionally, as an embodiment, the transceiving unit 610 is used to: configure, through type-1 sidelink configured grant, the sidelink transmission resource indication information for the terminal device, and the RRC used for the type-1 sidelink configured grant includes the time interval indication information and slot offset indication information. The first terminal device is configured to determine starting position of the sidelink transmission resource period according to the slot offset indication information, and determine the slot information of the first uplink transmission resource according to the time interval indication information and the starting position of the sidelink transmission resource period.

Optionally, as an embodiment, the period of the first uplink transmission resource and that of the sidelink transmission resource are the same.

Optionally, as an embodiment, the transceiving unit 610 is configured to: receive, on the first uplink transmission resource, PUCCH or PUSCH transmitted from the first terminal device, where the PUCCH or PUSCH includes the first feedback information.

Optionally, as an embodiment, the transceiving unit 610 is configured to: transmit retransmission resource indication information to the first terminal device if the first feedback information indicates that the sidelink data has not been received correctly, where the retransmission resource indication information is used for indicating retransmission resources on which the first terminal device retransmits the sidelink data to at least one second terminal device.

Optionally, as an embodiment, the transceiving unit 610 is configured to: transmit configured grant information to the first terminal device, and the configured grant information includes the sidelink transmission resource indication information and the first uplink transmission resource indication information.

Optionally, as an embodiment, the transceiving unit 610 is configured to: transmit first configured grant information to the first terminal device, where the first configured grant information includes the sidelink transmission resource indication information; and transmit second configured grant information to the first terminal device, where the second configured grant information includes the first uplink transmission resource indication information.

Optionally, as an embodiment, the first configured grant information includes associated information, or the second configured grant information includes associated information; where, the associated information is used for indicating that the first uplink transmission resource indication information corresponds to the sidelink transmission resource indication information.

Optionally, as an embodiment, the second configured grant information includes instruction information that is used to instruct the first terminal device to transmit the first feedback information on the first uplink transmission resource.

Optionally, as an embodiment, the sidelink transmission resource is used for transmitting at least one of the following between the first terminal device and at least one second terminal device: a sidelink data channel, a sidelink control channel, and a sidelink feedback channel.

Optionally, as an embodiment, the sidelink transmission resource indication information includes at least one of the following information: parameter information of the sidelink data channel, parameter information of the sidelink control channel, parameter information of the sidelink feedback channel, and the second uplink transmission resource indication information.

The parameter information of the sidelink data channel includes at least one of the following information: time domain resource parameters of the sidelink data channel, and frequency domain resource parameters of the sidelink data channel, DMRS, transmission mode, number of transmission layers, MCS, maximum transmission times, redundancy version information, number of HARQ processes, power control information, size of sidelink data, identification information of a terminal device that receives the sidelink data, priority information, time delay information, code block group (CBG) feedback indication, information about whether the sidelink data channel includes CSI-RS, the time domain resource parameter of the CSI-RS, the frequency domain resource parameter of the CSI-RS, and CSI feedback indication information.

The parameter information of the sidelink control channel includes at least one of the following information: time domain resource parameters of the sidelink control channel, frequency domain resource parameters of the sidelink control channel.

The parameter information of the sidelink feedback channel includes at least one of the following information: a time offset of the sidelink feedback channel relative to the sidelink data channel or the sidelink control channel; slot parameters of the sidelink feedback channel; frequency domain resource parameters of the sidelink feedback channel; the format of the sidelink feedback channel; information on whether the sidelink feedback is enabled; and the feedback mode of the sidelink feedback channel.

The second uplink transmission resource indication information is used by the first terminal device to determine a second uplink transmission resource, and the second uplink transmission resource is used by the first terminal device to transmit feedback information for the sidelink transmission resource indication information to the network device.

Optionally, as an embodiment, the format of the sidelink feedback channel includes: a short feedback channel and a long feedback channel.

Optionally, as an embodiment, the short feedback channel occupies one or two time domain symbols in a slot, and the time domain symbol(s) occupied by the short feedback channel is located prior to the time domain symbol occupied by the guard period; or, the long feedback channel occupies all time-domain symbols, that can be used for sidelink transmission, other than the guard period in a slot.

Optionally, as an embodiment, the feedback mode of the sidelink feedback channel includes a first mode and a second mode. In the first mode, if the terminal device and the second terminal device meet a preset threshold, the second terminal device transmits feedback information to the terminal device when having not received the sidelink data correctly, where the feedback information is NACK information; and the second terminal device does not transmit feedback information to the terminal device when having received the sidelink data correctly. If the terminal device and the second terminal device do not meet the preset threshold, the second terminal device does not transmit feedback information to the terminal device. In the second mode, the at least one second terminal device transmits the feedback information to the terminal device according to whether the sidelink data has been correctly received by the at least one second terminal device, where the feedback information is ACK information or NACK information.

Optionally, as an embodiment, the transceiving unit 610 is further configured to: if the sidelink transmission resource indication information includes the second uplink transmission resource indication information, receive, through the second uplink transmission resource, the feedback information for the sidelink transmission resource indication information transmitted from the first terminal device, where the second uplink transmission resource indication information is used for indicating the second uplink transmission resource and the feedback information for the sidelink transmission resource indication information is used for indicating whether the sidelink transmission resource indication information has been correctly received by the first terminal device.

It should be understood that the above and other operations and/or functions of each unit in the network device 600 can be used to implement the corresponding processes of the network device in the method 200 shown in FIGS. 4-10, which are not described here for the sake of brevity.

Therefore, according to the network device provided by the embodiments of the present application, the sidelink transmission resources allocated to the terminal device are only used for new data transmission of the sidelink data. While configuring the sidelink transmission resource for the sidelink data, the network device also configure the transmission resource for the feedback information for the sidelink data for the terminal device, so that the terminal device can feedback the transmission status of the sidelink data to the network device. When the terminal device needs to retransmit the sidelink data, the network device can dynamically allocate retransmission resources through which retransmission is realized. As a result, the resource utilization is improved, and all sidelink transmission resources are allocated by network device, which can reduce interference.

Optionally, the network device 600 may also be used to execute the method 300 of the embodiment of the present application. Specifically, the transceiving unit 610 is configured to: transmit the sidelink transmission resource indication information to the terminal device, and the sidelink transmission resource indication information is used for indicating a sidelink transmission resource set. The first terminal device uses the first sidelink transmission resource in the sidelink transmission resource set to transmit sidelink data to at least one second terminal device. The first terminal device uses the second sidelink transmission resource in the sidelink transmission resource set to retransmit the sidelink data to at least one second terminal device when determining that the sidelink data has not been received correctly.

Optionally, as an embodiment, the transceiving unit 610 is configured to: transmit configured grant information to the terminal device, and the configured grant information includes the sidelink transmission resource indication information.

Optionally, as an embodiment, the first sidelink transmission resource is used for transmitting at least one of the following between the first terminal device and at least one second terminal device: a sidelink data channel, a sidelink control channel, and a sidelink feedback channel.

Optionally, as an embodiment, the sidelink transmission resource indication information includes at least one of the following information: parameter information of the sidelink data channel, parameter information of the sidelink control channel, parameter information of the sidelink feedback channel, and the uplink transmission resource indication information.

The parameter information of the sidelink data channel includes at least one of the following information: time domain resource parameters of the sidelink data channel, and frequency domain resource parameters of the sidelink data channel, DMRS, transmission mode, number of transmission layers, MCS, maximum transmission times, redundancy version information, number of HARQ processes, power control information, size of sidelink data, identification information of a terminal device that receives the sidelink data, priority information, time delay information, code block group (CBG) feedback indication, information about whether the sidelink data channel includes CSI-RS, the time domain resource parameter of the CSI-RS, the frequency domain resource parameter of the CSI-RS, and CSI feedback indication information.

The parameter information of the sidelink control channel includes at least one of the following information: time domain resource parameters of the sidelink control channel, frequency domain resource parameters of the sidelink control channel.

The parameter information of the sidelink feedback channel includes at least one of the following information: a time offset of the sidelink feedback channel relative to the sidelink data channel or the sidelink control channel; slot parameters of the sidelink feedback channel; frequency domain resource parameters of the sidelink feedback channel; the format of the sidelink feedback channel; information on whether the sidelink feedback is enabled; and the feedback mode of the sidelink feedback channel.

The uplink transmission resource indication information is used by the first terminal device to determine an uplink transmission resource, and the uplink transmission resource is used by the first terminal device to transmit feedback information for the sidelink transmission resource indication information to the network device.

Optionally, as an embodiment, the format of the sidelink feedback channel includes: a short feedback channel and a long feedback channel.

Optionally, as an embodiment, the short feedback channel occupies one or two time domain symbols in a slot, and the time domain symbol(s) occupied by the short feedback channel is located prior to the time domain symbol occupied by the guard period; or, the long feedback channel occupies all time-domain symbols, that can be used for sidelink transmission, other than the guard period in a slot.

Optionally, as an embodiment, the feedback mode of the sidelink feedback channel includes a first mode and a second mode. In the first mode, if the terminal device and the second terminal device meet a preset threshold, the second terminal device transmits feedback information to the terminal device when having not received the sidelink data correctly, where the feedback information is NACK information; and the second terminal device does not transmit feedback information to the terminal device when having received the sidelink data correctly. If the terminal device and the second terminal device do not meet the preset threshold, the second terminal device does not transmit feedback information to the terminal device. In the second mode, the at least one second terminal device transmits the feedback information to the terminal device according to whether the sidelink data has been correctly received by the at least one second terminal device, where the feedback information is ACK information or NACK information.

Optionally, as an embodiment, the transceiving unit 610 is further configured to: if the sidelink transmission resource indication information includes the uplink transmission resource indication information, receive, through the uplink transmission resource, the feedback information for the sidelink transmission resource indication information transmitted from the first terminal device, where the uplink transmission resource indication information is used for indicating the uplink transmission resource and the feedback information for the sidelink transmission resource indication information is used for indicating whether the sidelink transmission resource indication information has been correctly received by the first terminal device.

It should be understood that the above and other operations and/or functions of each unit in the network device 600 can be used to implement the corresponding processes of the network device in the method 300 shown in FIGS. 11-13 respectively, which are not described here for the sake of brevity.

Therefore, according to the network device provided in the embodiment of the present application, the sidelink transmission resources configured for the terminal device can be used by the terminal device to perform initial transmission of the sidelink data, or they can be used for retransmission of the sidelink data. The terminal device autonomously selects resources used for initial transmission and retransmission among the configured sidelink transmission resources, which can reduce signaling overhead with network device.

Figure 19:
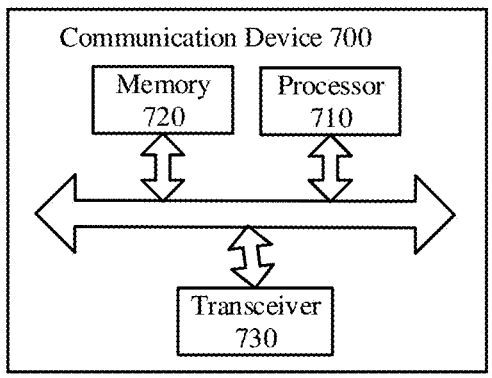
FIG. 19 is a schematic block diagram illustrating a communication device according to embodiments of the present application.

FIG. 19 is a schematic structural diagram of a communication device 700 provided by embodiments of the present disclosure. The communication device 700 shown in FIG. 19 includes a processor 710. The processor 710 may call a computer program from a memory and run the computer program to implement the method provided in the embodiments of the present disclosure.

Optionally, as shown in FIG. 19, the communication device 700 may further include a memory 720. The processor 710 may call the computer program from the memory 720 and run the computer program to implement the method provided in the embodiments of the present disclosure.

The memory 720 may be separated from the processor 710, or may be integrated into the processor 710.

Optionally, as shown in FIG. 19, the communication device 700 may further include a transceiver 730, and the processor 710 may control the transceiver 730 to communicate with other devices. Specifically, the transceiver 730 may transmit information or data to other devices, or receive information or data transmitted from other devices.

The transceiver 730 may include a transmitter and a receiver. The transceiver 730 may further include antennas, and the number of antennas may be one or more.

Optionally, the communication device 700 may be the network device of the embodiments of the present application, and may implement the corresponding process implemented by the network device in each method of the embodiments of the present application. For the sake of brevity, details are not repeated here.

Optionally, the communication device 700 may be the mobile terminal/terminal device of the embodiments of the present disclosure, and may implement the corresponding process implemented by the mobile terminal/terminal device in each method of the embodiments of the present disclosure. For the sake of brevity, details are not repeated here.

Figure 20:
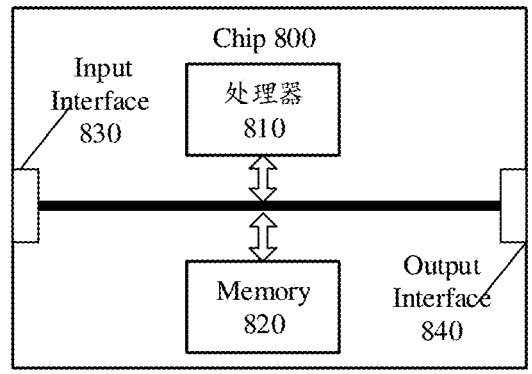
FIG. 20 is a schematic block diagram illustrating a chip provided by embodiments of the present application.

FIG. 20 is a schematic structural diagram of a chip provided by an embodiment of the present disclosure. The chip 800 shown in FIG. 20 includes a processor 810. The processor 810 may call a computer program from a memory and run the computer program to implement the method provided in the embodiments of the present disclosure.

Optionally, as shown in FIG. 20, the chip 800 may further include a memory 820. The processor 810 may call the computer program from the memory 820 and run the computer program to implement the method provided in the embodiments of the present disclosure.

The memory 820 may be separated from the processor 810, or may be integrated into the processor 810.

Optionally, the chip 800 may further include an input interface 830. The processor 810 can control the input interface 830 to communicate with other devices or chips, and specifically, can obtain information or data transmitted from other devices or chips.

Optionally, the chip 800 may further include an output interface 840. The processor 810 can control the output interface 840 to communicate with other devices or chips, and specifically, can output information or data to other devices or chips.

Optionally, the chip may be applied to the network device in the embodiments of the present disclosure, and may implement the corresponding process implemented by the network device in each method of the embodiments of the present disclosure. For the sake of brevity, details are not repeated here.

Optionally, the chip may be applied to the mobile terminal/terminal device of the embodiments of the present disclosure, and may implement the corresponding process implemented by the mobile terminal/terminal device in each method of the embodiments of the present disclosure. For the sake of brevity, details are not repeated here.

It should be understood that the chip described in embodiments of the present disclosure can also be referred to as a system on chip, a system chip or a chip system and so on.

Figure 21:
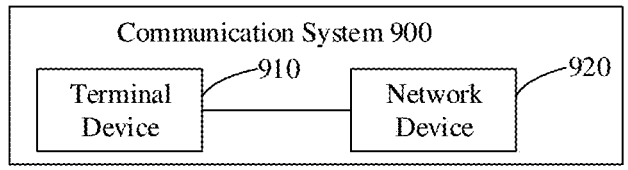
FIG. 21 is a schematic diagram illustrating a communication system provided by embodiments of the present application.

FIG. 21 is a schematic diagram illustrating a communication system 900 provided by embodiments of the present disclosure. As shown in FIG. 21, the communication system 900 includes a terminal device 910 and a network device 920.

The terminal device 910 may implement corresponding functions performed by the terminal device in methods described above, and the network device 920 may implement corresponding functions performed by the network device in the methods described above. For the sake of brevity, details are not repeated here.

It should be understood that the processor of the embodiments of the present disclosure may be an integrated circuit chip with signal processing capability. In the implementation process, the steps of the foregoing method embodiments can be performed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application can be directly executed by a hardware decoding processor, or executed by a combination of hardware and software modules in the decoding processor. The software module can be located in a mature storage medium in the field such as a random access memory, a flash memory, a read-only memory, a programmable read-only memory, or an electrically erasable programmable memory, registers. The storage medium is located in the memory, and the processor reads the information in the memory and completes the steps of the above method in combination with its hardware.

It should be understood that the memory in the embodiments of the present disclosure may be volatile memory or non-volatile memory, or may include both volatile and non-volatile memory. The non-volatile memory can be read-only memory (ROM), programmable read-only memory (PROM), erasable programmable read-only memory (EPROM), and Electrically Erasable programmable read-only memory (EEPROM) or flash memory. The volatile memory may be a random access memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these memories and any other suitable types of memories.

It should be understood that the above memories are exemplary rather than limitation. For example, the memory in the embodiments of the present disclosure may be a static RAM (SRAM), a dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM) and so on. In other words, the memories in the embodiments of the present disclosure are intended to include, but are not limited to, these memories and any other suitable types of memories.

The embodiments of the present disclosure further provide a computer readable storage medium for storing computer programs.

Optionally, the computer readable storage medium may be applied to the network device provided in the embodiments of the present disclosure, and the computer programs cause the computer to execute the corresponding process implemented by the network device in each method of the embodiments of the present disclosure. For brevity, details are not described herein again.

Optionally, the computer readable storage medium may be applied to the mobile terminal/terminal device provided in the embodiments of the present disclosure, and the computer programs cause the computer to execute the corresponding process implemented by the mobile terminal/terminal device in each method of the embodiments of the present disclosure. For brevity, details are not described herein again.

The embodiments of the present disclosure further provide a computer program product including computer program instructions.

Optionally, the computer program product may be applied to the network device provided in the embodiments of the present disclosure, and the computer program instructions cause the computer to execute the corresponding process implemented by the network device in each method of the embodiments of the present disclosure. For brevity, details are not described herein again.

Optionally, the computer program product may be applied to the mobile terminal/terminal device provided in the embodiments of the present disclosure, and the computer program instructions cause the computer to execute the corresponding process implemented by the mobile terminal/terminal device in each method of the embodiments of the present disclosure. For brevity, details are not described herein again.

The embodiments of the present application further provide a computer program.

Optionally, the computer program may be applied to the network device provided in the embodiments of the present disclosure, and the computer program, when run on a computer, causes the computer to execute the corresponding process implemented by the network device in each method of the embodiments of the present disclosure. For brevity, details are not described herein again.

Optionally, the computer program may be applied to the mobile terminal/terminal device provided in the embodiments of the present disclosure, and the computer program, when run on a computer, causes the computer to execute the corresponding process implemented by the mobile terminal/terminal device in each method of the embodiments of the present disclosure. For brevity, details are not described herein again.

Those ordinary skilled in the art may realize that the units and algorithm steps of the examples described in combination with the embodiments can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of this application.

Those skilled in the art can clearly understand that, for convenience and concise description, the specific working process of the above-described system, device, and units can refer to the corresponding process in the foregoing method embodiment, and details are not repeated herein.

In some embodiments provided in the present disclosure, it should be understood that the proposed system, device, and method may be implemented in other ways. For example, the device embodiments described above are merely illustrative. For example, the division of the units is only a logical function division, and there may be other divisions in actual implementation, for example, multiple units or components may be combined or It can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

If the function is implemented in the form of a software functional unit and sold or used as an independent product, it can be stored in a computer readable storage medium. In view of this, the technical solution of this application in essence or the part that contributes to the prior art or the part of the technical solution can be embodied in the form of a software product, and the computer software product is stored in a storage medium.

The storage medium includes several instructions so that a computer (which may be a personal computer, a server, or a network device, etc.) executes all or part of the steps of the methods described in the various embodiments of the present disclosure. The aforementioned storage medium includes: U disk, mobile hard disk drive, Read-Only Memory (ROM), Random Access Memory (RAM), magnetic disks or optical disks and other media that can store program codes.

The above are merely exemplary implementations of the present disclosure, but the protection scope of the present disclosure is not limited thereto. Any changes or substitutions easily conceived by those skilled in the art based on the contents of the present disclosure fall within the protection scope of the present disclosure. Therefore, the protection scope of the present disclosure shall be defined by the appended claims.

What is claimed is:

1. A method for transmitting sidelink data, comprising:
receiving, by a first terminal device, sidelink transmission resource indication information and first uplink transmission resource indication information configured by a network device, wherein the sidelink transmission resource indication information is used for indicating a sidelink transmission resource, and the first uplink transmission resource indication information is used for indicating a first uplink transmission resource;
transmitting, by the first terminal device, sidelink data to at least one second terminal device on the sidelink transmission resource; and
transmitting, by the first terminal device, first feedback information to the network device on the first uplink transmission resource, wherein the first feedback information is used for indicating whether the sidelink data has been received correctly,
wherein the first uplink transmission resource indication information is used for determining at least one of the following information:

period information of the first uplink transmission resource, time domain symbol information in the slot of the first uplink transmission resource, and a number of time domain symbols occupied by the first uplink transmission resource in the slot, wherein the first uplink transmission resource indication information comprises time interval indication information, and the method further comprises:

determining, by the first terminal device, the slot information of the first uplink transmission resource according to the time interval indication information and the sidelink transmission resource indication information, and wherein the determining, by the first terminal device, the slot information of the first uplink transmission resource according to the time interval indication information and the sidelink transmission resource indication information comprises:

when the sidelink transmission resource indication information is configured through type-1 sidelink configured grant, and RRC used for the type-1 sidelink configured grant comprises the time interval indication information and slot offset indication information, determining, by the first terminal device, starting position of a sidelink transmission resource period according to the slot offset indication information, and determining the slot information of the first uplink transmission resource according to the time interval indication information and the starting position of the sidelink transmission resource period.

2. The method according to claim 1, wherein the first uplink transmission resource indication information is further used for determining at least one of the following information:

slot information of the first uplink transmission resource, and frequency domain information of the first uplink transmission resource.

3. The method according to claim 1, wherein a period of the first uplink transmission resource is same as the sidelink transmission resource period.

4. The method according to claim 1, wherein the transmitting, by the first terminal device, first feedback information to the network device on the first uplink transmission resource comprising:

transmitting, by the first terminal device, a physical uplink control channel PUCCH or a physical uplink shared channel PUSCH to the network device on the first uplink transmission resource, wherein the PUCCH or PUSCH comprises the first feedback information.

5. The method according to claim 1, further comprising:
receiving, by the first terminal device, second feedback information transmitted from the at least one second terminal device, wherein the second feedback information is used for indicating whether the sidelink data has been received correctly.

6. The method according to claim 5, further comprising:
determining, by the first terminal device, whether the sidelink data has been received correctly according to the second feedback information;
when the sidelink data has not been received correctly, determining, by the first terminal device, that the first feedback information is used for indicating that the sidelink data has not been received correctly;
when the sidelink data has been received correctly, determining, by the first terminal device, that the first feedback information is used for indicating that the sidelink data has been received correctly.

7. The method according to claim 1, wherein the receiving, by a first terminal device, sidelink transmission resource indication information and first uplink transmission resource indication information configured by a network device comprises:

receiving, by the first terminal device, configured grant information transmitted from the network device, wherein the configured grant information comprises the sidelink transmission resource indication information and the first uplink transmission resource indication information.

8. The method according to claim 1, wherein the sidelink transmission resource is used for transmitting at least one of the following between the first terminal device and the at least one second terminal device: a sidelink data channel, a sidelink control channel, and a sidelink feedback channel.

9. The method according to claim 8, wherein the sidelink transmission resource indication information comprises at least one of the following information: parameter information of the sidelink data channel, parameter information of the sidelink control channel, and parameter information of the sidelink feedback channel;

wherein the parameter information of the sidelink data channel comprises at least one of the following information: time domain resource parameters of the sidelink data channel, frequency domain resource parameters of the sidelink data channel, demodulation reference signal (DMRS), modulation and coding scheme (MCS), maximum transmission times, a number of hybrid automatic repeat request (HARQ) processes, power control information, identification information of a terminal device that receives the sidelink data, priority information, information about whether the sidelink data channel comprises channel state information-reference signal (CSI-RS);

the parameter information of the sidelink control channel comprises at least one of the following information: time domain resource parameters of the sidelink control channel, frequency domain resource parameters of the sidelink control channel;

the parameter information of the sidelink feedback channel comprises at least one of the following information: a time offset of the sidelink feedback channel relative to the sidelink data channel or the sidelink control channel; slot parameters of the sidelink feedback channel; frequency domain resource parameters of the sidelink feedback channel; information on whether the sidelink feedback is enabled.

10. The method according to claim 9, wherein the transmitting, by the first terminal device, sidelink data to at least one second terminal device on the sidelink transmission resource comprises:

transmitting, by the first terminal device, sidelink control information to the at least one second terminal device on the sidelink transmission resource, wherein the sidelink control information is used for scheduling the sidelink data channel.

11. The method according to claim 10, wherein the sidelink control information further comprises at least one of the following information: HARQ process information, new data indication (NDI) information, and parameter information of the sidelink feedback channel, wherein the sidelink feedback channel is used to carry feedback information for the sidelink data channel.

12. The method according to claim 9, wherein the feedback mode of the sidelink feedback channel comprises a first mode and a second mode, wherein in the first mode, when the first terminal device and the second terminal device meet a preset threshold, the second terminal device transmits feedback information to the first terminal device when having not received the sidelink data correctly, wherein the feedback information is negative acknowledgement (NACK) information, and the second terminal device does not transmit feedback information to the first terminal device when having received the sidelink data correctly; in the second mode, the at least one second terminal device transmits the feedback information to the first terminal device according to whether the sidelink data has been correctly received by the at least one second terminal device, wherein the feedback information is acknowledgement (ACK) information or NACK information.

13. A terminal device, comprising: a processor and a memory, wherein the memory is configured to store a computer program, and the processor is configured to call and run the computer program stored in the memory to execute operations of:
receiving sidelink transmission resource indication information and first uplink transmission resource indication information configured by a network device, wherein the sidelink transmission resource indication information is used for indicating a sidelink transmission resource, and the first uplink transmission resource indication information is used for indicating a first uplink transmission resource;
transmitting sidelink data to at least one second terminal device on the sidelink transmission resource; and
transmitting first feedback information to the network device on the first uplink transmission resource, wherein the first feedback information is used for indicating whether the sidelink data has been received correctly,
wherein the first uplink transmission resource indication information is used for determining at least one of the following information:
period information of the first uplink transmission resource, time domain symbol information in the slot of the first uplink transmission resource, and a number of time domain symbols occupied by the first uplink transmission resource in the slot,
wherein the first uplink transmission resource indication information comprises time interval indication information, and the processor is further configured to execute an operation of:
determining, according to the time interval indication information and the sidelink transmission resource indication information, the slot information of the first uplink transmission resource, and
wherein the processor is further configured to execute an operation of:
when the sidelink transmission resource indication information is configured through type-1 sidelink configured grant, and RRC used for the type-1 sidelink configured grant comprises the time interval indication information and slot offset indication information, determining starting position of a sidelink transmission resource period according to the slot offset indication information, and determining the slot information of the first uplink transmission resource according to the time interval indication information and the starting position of the sidelink transmission resource period.

14. The terminal device according to claim 13, wherein the first uplink transmission resource indication information is further used for determining at least one of the following information:
slot information of the first uplink transmission resource, and frequency domain information of the first uplink transmission resource.

15. A network device, comprising: a processor and a memory, wherein the memory is configured to store a computer program, and the processor is configured to call and run the computer program stored in the memory to execute operations of:
transmitting sidelink transmission resource indication information and first uplink transmission resource indication information to a first terminal device, wherein the sidelink transmission resource indication information is used for indicating a sidelink transmission resource that is used for transmitting sidelink data to at least one second terminal device from the first terminal device, and the first uplink transmission resource indication information is used for indicating a first uplink transmission resource; and
receiving, on the first uplink transmission resource, first feedback information transmitted from the first terminal device, wherein the first feedback information is used for indicating whether the sidelink data has been received correctly,
wherein the first uplink transmission resource indication information is used by the first terminal device for determining at least one of the following information:
period information of the first uplink transmission resource, time domain symbol information in the slot of the first uplink transmission resource, and a number of time domain symbols occupied by the first uplink transmission resource in the slot,
wherein the first uplink transmission resource indication information comprises time interval indication information,
wherein the time interval indication information and the sidelink transmission resource indication information are configured for use by the first terminal device to determine slot information of the first uplink transmission resource, and
wherein the processor is further configured to execute an operation of:
configuring the sidelink transmission resource indication information for the first terminal device through type-1 sidelink configured grant, wherein RRC used for the type-1 sidelink configured grant comprises the time interval indication information and slot offset indication information, the slot offset indication information is used by the first terminal device to determine starting location of a sidelink transmission resource period, and the time interval indication information and the starting location of the sidelink transmission resource period are used by the first terminal device to determine the slot information of the first uplink transmission resource.

16. The network device according to claim 15, wherein the first uplink transmission resource indication information is further used by the first terminal device to determine at least one of the following information:
slot information of the first uplink transmission resource, and frequency domain information of the first uplink transmission resource.

* * * * *